(12) United States Patent
Poling et al.

(10) Patent No.: US 11,494,965 B2
(45) Date of Patent: *Nov. 8, 2022

(54) HAND DRAWN ANIMATION MOTION PATHS

(71) Applicant: Apple Inc., Cupertino, CA (US)

(72) Inventors: Ryan John Poling, Los Gatos, CA (US); Steven G. Forrest, Pittsburgh, PA (US); Amy W. Hung, San Francisco, CA (US); Daniel H. Mai, Cupertino, CA (US); Gary W. Gehiere, Scotts Valley, CA (US); Jonathan Cho, San Francisco, CA (US); Thomas Valentine Frauenhofer, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,391

(22) Filed: May 10, 2021

(65) Prior Publication Data
US 2021/0366175 A1 Nov. 25, 2021

Related U.S. Application Data

(63) Continuation of application No. 16/453,646, filed on Jun. 26, 2019, now Pat. No. 11,004,249.
(Continued)

(51) Int. Cl.
*G06T 13/80* (2011.01)
*G06F 3/04883* (2022.01)
(Continued)

(52) U.S. Cl.
CPC .......... *G06T 13/80* (2013.01); *G06F 3/04817* (2013.01); *G06F 3/04883* (2013.01); *G06T 11/203* (2013.01)

(58) Field of Classification Search
None
See application file for complete search history.

(56) References Cited

U.S. PATENT DOCUMENTS 6,111,590 A     8/2000   Boezeman et al.
6,802,061 B1 *  10/2004  Parthasarathy ........... G06F 8/61
                                                            717/120

(Continued)

OTHER PUBLICATIONS

Joan Lambert, MOS 2016 Study Guide EXAM 77-729 Microsoft PowerPoint, all pages, 2016.
(Continued)

*Primary Examiner* — Frank S Chen
(74) *Attorney, Agent, or Firm* — Fletcher Yoder PC

(57) ABSTRACT

Techniques are provided for hand drawing an animation motion path for an object to follow on a graphical user interface (GUI). The motion path may be drawn with a user's finger or drawing device, such as an Apple Pencil®, by selecting a drawing tool (e.g., a freehand tool and/or straight line tool). A new motion path may be added to an existing motion path, such that the new motion path is an extension of the existing motion path. The new motion path may also be added to an end point of an existing motion path, such that the new motion path is a different segment of a motion path and is associated with a new key frame. A motion path segment may be split into additional segments with new key frames, reshaped using editing points, redrawn, and/or deleted from the overall motion path.

18 Claims, 33 Drawing Sheets

Related U.S. Application Data

(60) Provisional application No. 62/820,175, filed on Mar. 18, 2019.

(51) Int. Cl.
*G06F 3/04817* (2022.01)
*G06T 11/20* (2006.01)

(56) References Cited

U.S. PATENT DOCUMENTS

| | | |
|---|---|---|
| 7,342,586 B2 | 3/2008 | Jaeger |
| 8,860,730 B2 | 10/2014 | Ooba |
| 10,049,483 B2 | 8/2018 | Kim et al. |
| 2005/0231512 A1 | 10/2005 | Niles et al. |
| 2009/0204880 A1* | 8/2009 | Ko .................. G09B 5/062 715/202 |
| 2010/0134499 A1 | 6/2010 | Wang et al. |
| 2011/0181521 A1 | 7/2011 | Reid et al. |
| 2015/0062129 A1 | 3/2015 | Wilensky et al. |
| 2015/0067570 A1* | 3/2015 | Yoon .................. G06F 3/04886 715/773 |

OTHER PUBLICATIONS

Geetesh Bajaj, Drawing Freeform Lines in PowerPoint 2016 for Windows, Feb. 8, 2017, all pages.

* cited by examiner

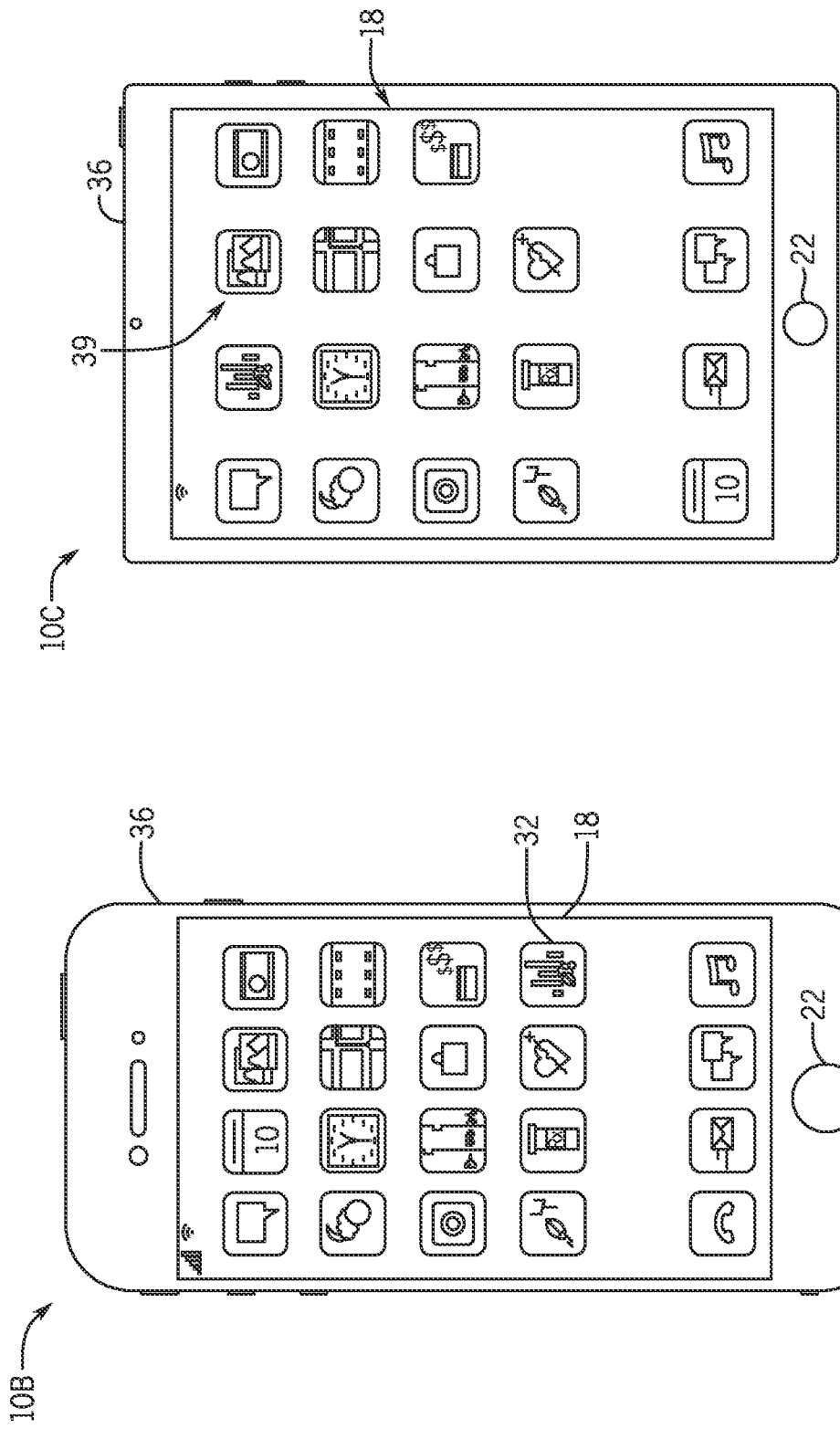

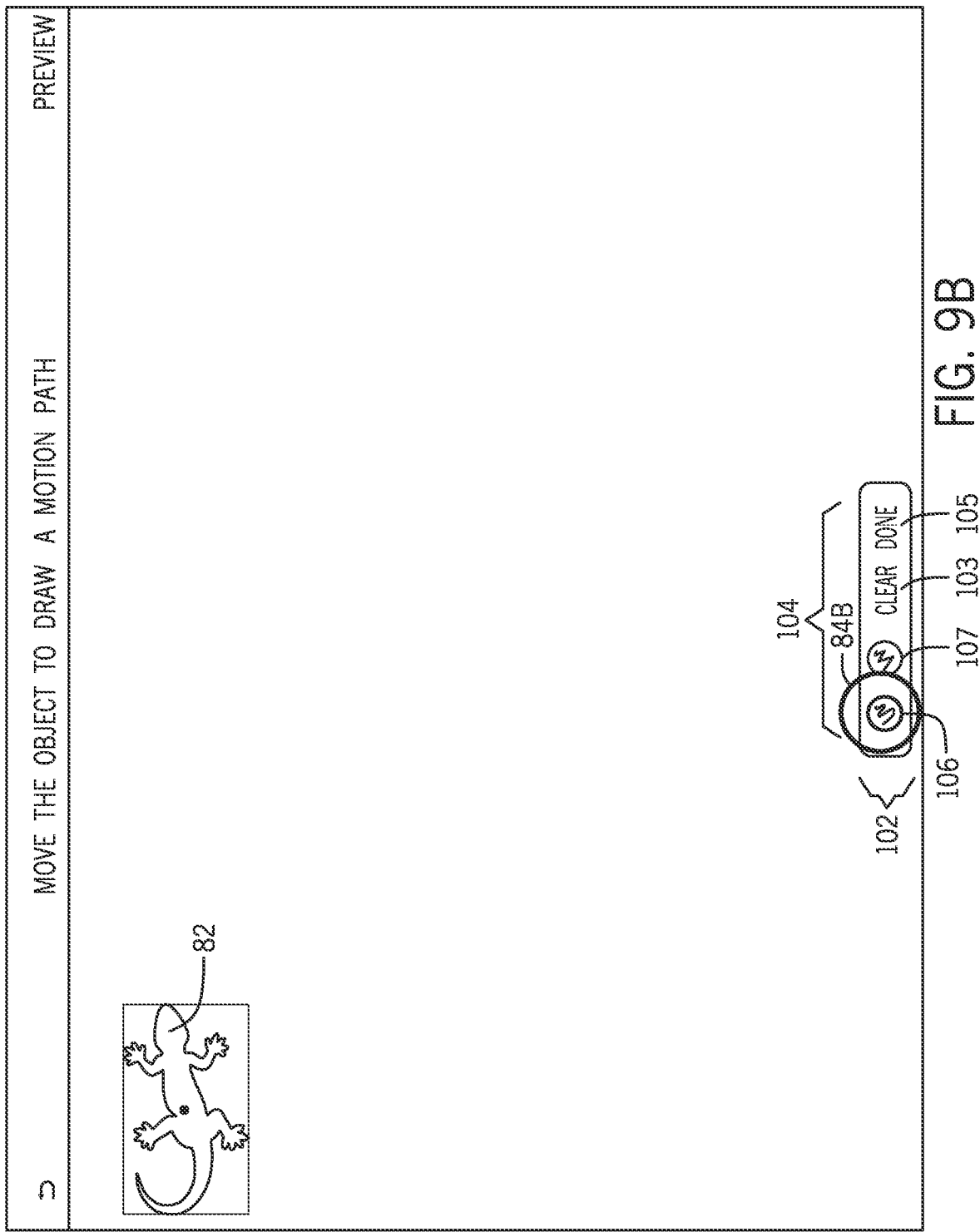

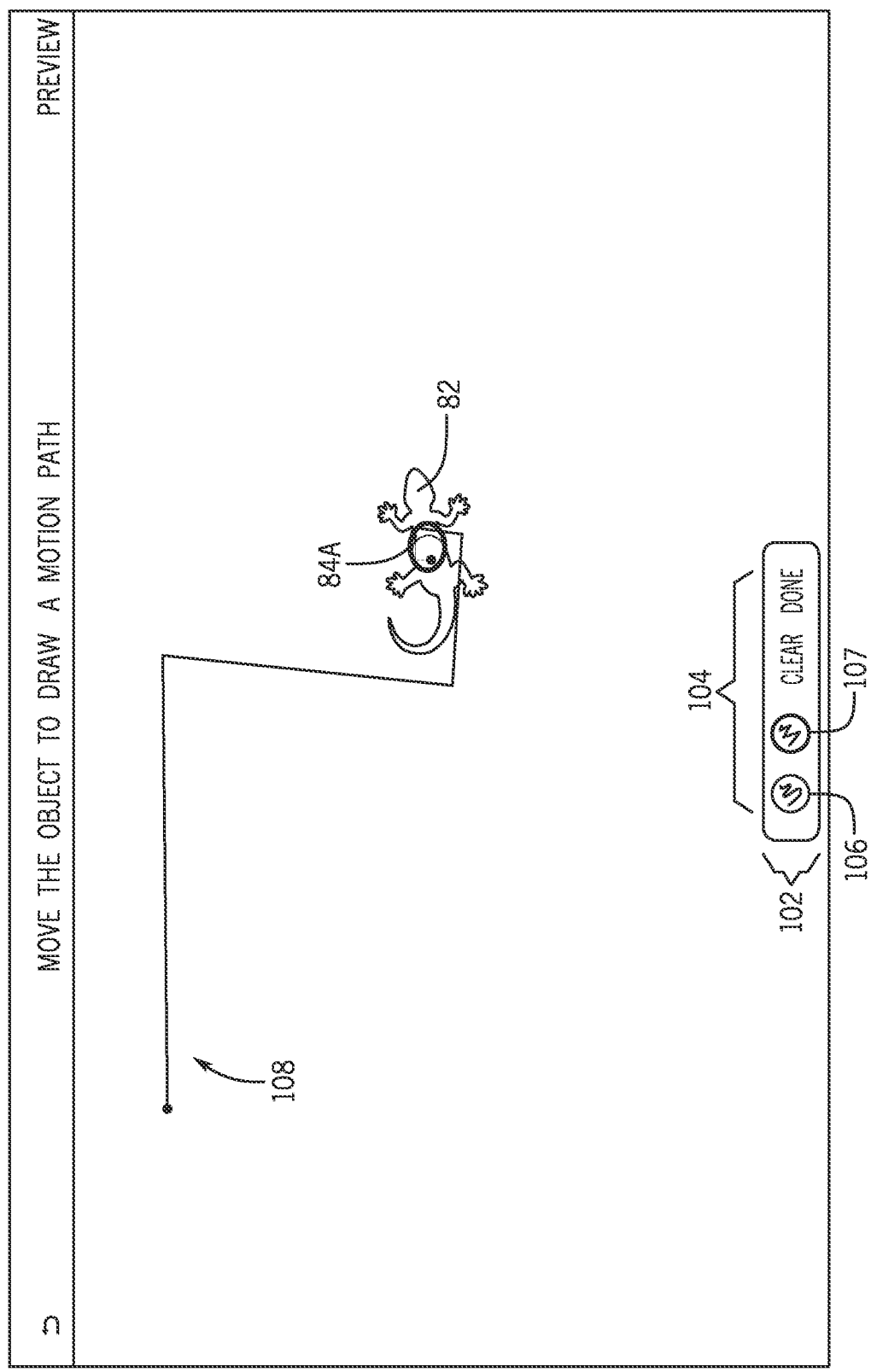

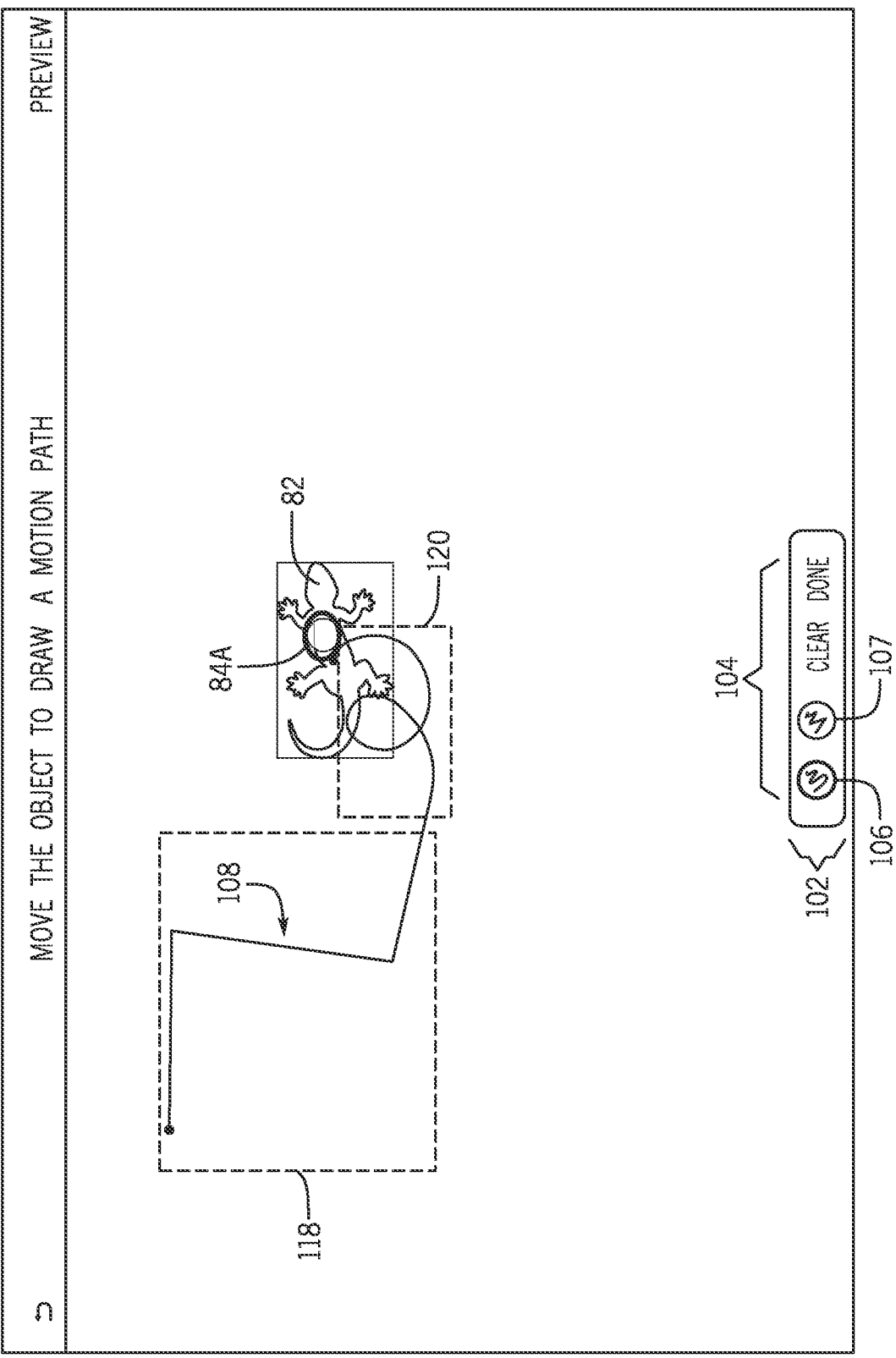

HAND DRAWN ANIMATION MOTION PATHS

CROSS-REFERENCE TO RELATED APPLICATION

This application is a continuation of Ser. No. 16/453,646, entitled "HAND DRAWN ANIMATION MOTION PATHS," filed Jun. 26, 2019, which claims priority to and the benefit of U.S. Provisional Application No. 62/820,175, entitled "HAND DRAWN ANIMATION MOTION PATHS," filed Mar. 18, 2019, each of which is herein incorporated by reference in its entirety.

BACKGROUND

The present disclosure relates generally to techniques for hand drawing animation paths for an animated object to follow on a slide of a presentation application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Presentation applications are often used to provide a visualization or illustrate important points of discussion during a presentation. To facilitate or enhance the presentation, objects, such as text boxes, shapes, and/or images, may be animated on a slide of the presentation. For example, a user may choose a predefined animation of the presentation application package to bring attention to a particular object. The animation may include special effects, for example, making an image move from one side of the slide to an opposite side. Often, the path for making such movements (e.g., an image follows a path to move from one side of the slide to the other), may be predefined and limited to a particular shape. For example, a predefined motion path used to animate the image may include a linear path effect.

However, since the motion path may be predefined, the path shape options may be limited and dependent on the application (e.g., application package provided by a manufacturer). Unfortunately, the predefined motion path may be inadequate for a user wanting to present objects with effects beyond the limitations of the path, such as a straight line path provided by the application.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein are related to facilitating the use of hand drawn motion paths for animating an object on a presentation slide. In some embodiments, a user may hand draw the path using a freehand tool or a straight line tool, and a corresponding motion path may be generated. The object may follow along the generated motion path during a presentation.

In another embodiment, a user may add a new motion path to an existing motion path, such that the new motion path is an extension of the existing motion path. The new motion path may be drawn using the freehand tool and/or the straight line tool. Thus, the existing motion path with the new motion path may include a freehand motion, a straight line motion, or both. The extension may be used to provide a seamless transition from the existing motion path to the new motion path, such that the transition is not noticeable (e.g., without delay and in the same key frame).

On the other hand, and in some embodiments, a new motion path may be added to the end point of the existing motion path, such that the new motion path is a different segment of a motion path. Rather than providing a seamless transition like a motion path extension, the new motion path segment may include a new key frame. Thus, the new key frame may allow a noticeable transition between the existing motion path and the new motion path segment. The new motion path segment may be selected and split into additional segments, reshaped using editing points, and/or deleted from the motion path.

Furthermore, in some embodiments, the actions applied to the object may be indicated by an associated tray. The tray may include each action (e.g., action build) applied to the object. Moreover, the tray may provide a popover dialog box upon selection an action. The dialog box may provide context-specific properties related to the action that may be edited.

BRIEF DESCRIPTION OF THE DRAWINGS

Various aspects of this disclosure may be better understood upon reading the following detailed description and upon reference to the drawings in which:

FIG. 3 is a front view of a handheld device representing another embodiment of the electronic device of FIG. 1, in accordance with an embodiment of the present disclosure;

FIG. 4 is a front view of a hand-held tablet device representing another embodiment of the electronic device of FIG. 1 in accordance with an embodiment of the present disclosure;

FIG. 9B is a block diagram of the object in a drawing mode in response to a request to create a hand drawn motion path for the object of FIG. 9A, in accordance with an embodiment of the present disclosure;

FIG. 9E is a block diagram of the motion path created using a straight line tool in the drawing mode of FIG. 9B, in accordance with an embodiment of the present disclosure;

FIG. 11A is block diagram of adding a new motion path extension to an existing motion path, in accordance with an embodiment of the present disclosure;

DETAILED DESCRIPTION OF SPECIFIC EMBODIMENTS

Figure 1:
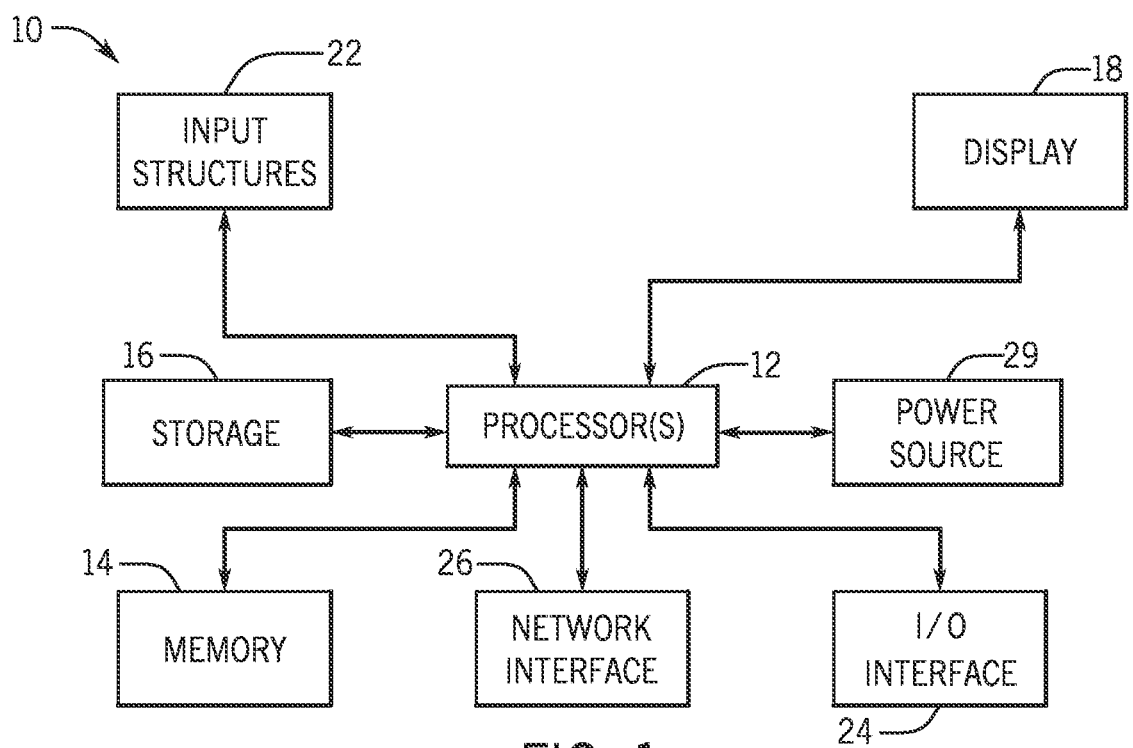
FIG. 1 is a block diagram of an electronic device that may benefit from a hand drawn motion path for an object on a presentation slide, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. In some embodiments, it should be understood that references to "one embodiment" or "an embodiment" of the present disclosure are not intended to be interpreted as excluding the existence of additional embodiments that also incorporate the recited features.

The present disclosure is generally directed to enabling freehand and/or straight line motion paths for an object to follow on a presentation slide. The ability to use a freehand motion, a straight line motion, or a combination of the two, for drawing a motion path may improve the effectiveness of animated objects to illustrate ideas in a presentation.

As discussed herein, in certain implementations, a motion path applied to an object on a presentation slide may include one or more freehand (e.g., curved, non-linear, etc.) and/or straight line motion paths. For example, rather than an application-supplied linear motion path (e.g., path to move up, down, and/or across the slide), which may be the default motion path, a user may draw the motion path in a freehand and/or straight line manner, such that the object is animated to move along various shaped motion paths. Moreover, more than a single drawing type (e.g., freehand or straight line) may be used to draw the motion path by using extension paths. The path extensions may switch between freehand and straight line paths as the object continues along the entire motion path. Motion of the object along the motion path may be triggered by a triggering action (e.g., a mouse click, finger tap, etc.). Path extensions may continue movement without additional triggering actions.

Further, after the motion path has been drawn and completed, a new motion path segment may be added to the existing motion path (e.g., motion path with a series of freehand and straight line extension paths). New motion path segments may use an additional trigger to affect movement of the object. The segments (e.g., existing motion path or new motion path) may be selected and modified. In certain embodiments, the modification may include redrawing the path. In other embodiments, selectable editing nodes may appear on the selected segment, and the segment may be adjusted by dragging a selected editing node. The path segment may also be split at the point of the selected node. When a path segment is split, another key frame may be included in the presentation slide, such that there is a noticeable transition (e.g., pause) between the key frames during presentation. In some implementations, a split path segment may be deleted, such that the split and associated key frame are removed. In this manner, the original path segment is preserved during the split and restored upon removal of the split.

In some embodiments, a tray may be associated with the actions or animations applied to the object. For example, in response to selecting the object, each action (e.g., motion path, scaling, rotation, etc.) applied to the object may be indicated in the tray. Additionally, the actions in the tray may be selected in an editing mode. Upon selection, the action may indicate context-specific properties (e.g., duration of a motion path) that may be modified (e.g., slowed down). In some embodiments, the duration of the motion path may be dynamic (e.g., nonlinear time) based in part on the length of the motion path. For example, the object may move faster along the motion path for a relatively longer motion path, while the object may move slower along a relatively shorter path.

With the foregoing in mind, a general description of a variety of suitable electronic devices may employ the techniques described herein to provide a freehand or straight line motion path that is applied to an object of on a presentation slide. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10.

Figure 2:
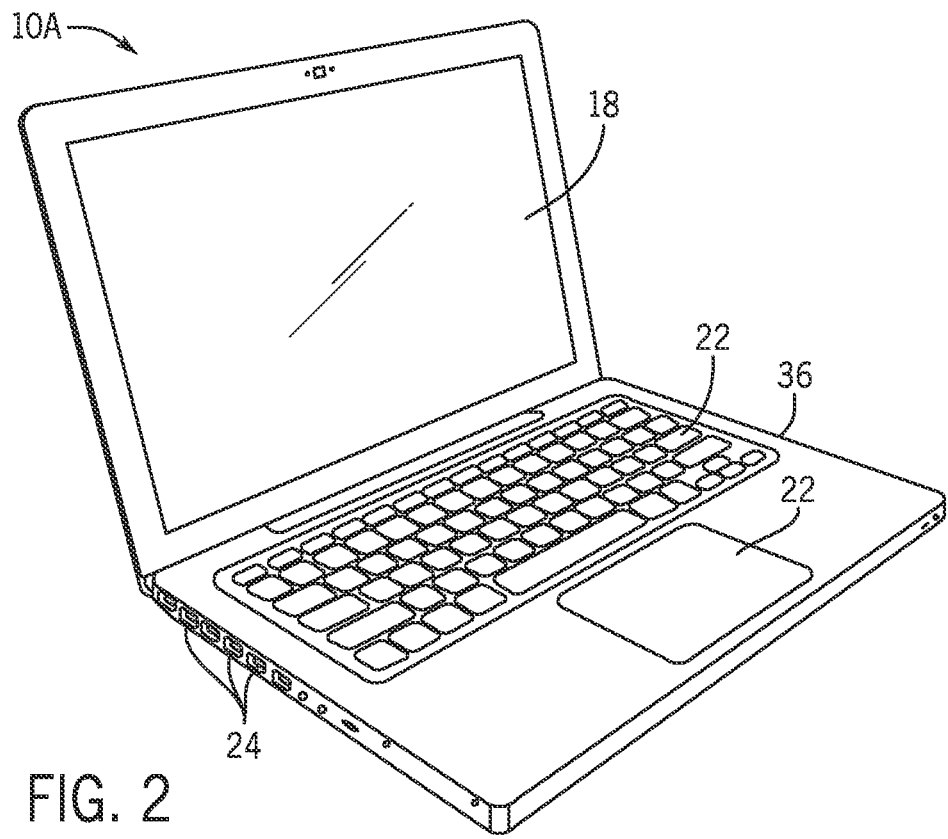
FIG. 2 is a perspective view of a notebook computer representing an embodiment of the electronic device of FIG. 1, in accordance with an embodiment of the present disclosure.
Figure 5:
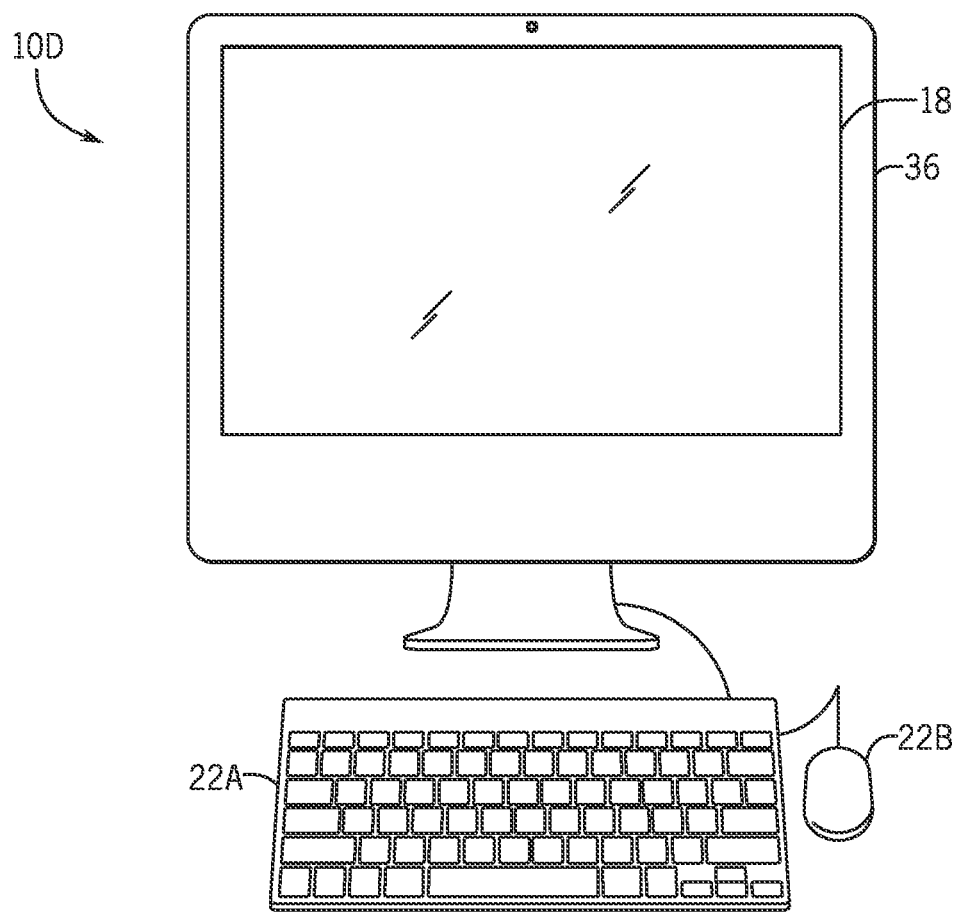
FIG. 5 is a front view of a desktop computer representing another embodiment of the electronic device of FIG. 1, in accordance with an embodiment of the present disclosure.
Figure 6:
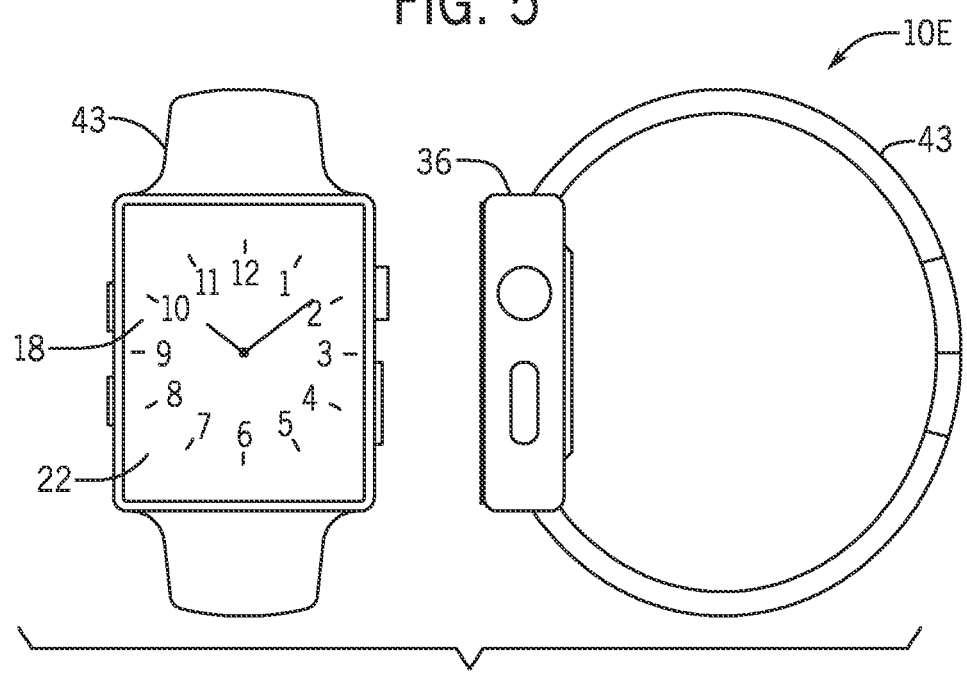
FIG. 6 is a front view and side view of a wearable electronic device representing another embodiment of the electronic device of FIG. 1, in accordance with an embodiment of the present disclosure.

By way of example, the electronic device 10 may represent a block diagram of the notebook computer depicted in FIG. 2, the handheld device depicted in FIG. 3, the handheld tablet device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as machine-readable instructions (e.g., software or firmware), hardware, or any combination thereof. Furthermore, the data processing circuitry may be separate components, components of a single contained processing module (e.g., a system-on-a-chip device), or may be incorporated wholly or partially within any of the other elements within the electronic device 10.

In the electronic device 10 of FIG. 1, the display 18 may be any suitable electronic display used to display image data (e.g., a liquid crystal display (LCD) or an organic light emitting diode (OLED) display). In some examples, the display 18 may represent one of the input structures 22, enabling users to interact with a user interface of the electronic device 10. In some embodiments, the electronic display 18 may be a MultiTouch™ display that may detect multiple touches at once, such as a finger and/or electronic pencil touching the display 18 to draw a motion path. Other input structures 22 of the electronic device 10 may include buttons, keyboards, mice, trackpads, and the like. The I/O interface 24 may enable electronic device 10 to interface with various other electronic devices (e.g., pressing a button to increase or decrease a volume level), as may the network interface 26.

The network interface 26 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

The processor(s) 12 and/or other data processing circuitry may execute instructions and/or operate on data stored in the memory 14 and/or nonvolatile storage 16. In some embodiments, the processor(s) 12 of the electronic device 10 of FIG. 1 may be operably coupled with the memory 14 and the nonvolatile storage 16 to facilitate the use of the processors(s) 12 to implement various stored algorithms. As discussed herein, the algorithms may include algorithms enabling a drawing tool in a drawing mode of a presentation application to draw a freehand and/or straight line motion path for an object. Additional algorithms may include an algorithm to add a freehand or straight line extension path to an existing motion path, add a new motion path segment to a completed motion path, redraw a motion path, and/or split a motion path. Other algorithms may include an algorithm to allow modifications to context-specific properties of specific actions indicated in a tray that are associated with the actions applied to the object.

Such programs or instructions executed by the processor(s) 12 may be stored in any suitable article of manufacture that includes one or more tangible, computer-readable media at least collectively storing the instructions or routines, such as the memory 14 and the nonvolatile storage 16. In another embodiment, the processor(s) 12 may receive an indication of a user drawing a motion path (e.g., by freehand or straight line), for example, by the input structures 22. The processor(s) 12 may generate the motion path to present the animation based upon this indication.

The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities. By way of example, a computer program product containing the instructions may include an operating system (e.g., OS X® or iOS by Apple Inc.) or an application program (e.g., Numbers®, Pages®, or Keynote® by Apple Inc.) or a suite of such application programs (e.g., iWork® by Apple Inc.).

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2. The depicted computer 10A may include a housing or enclosure 36, a display 18, input structures 22, and ports of an I/O interface 24. In one embodiment, the input structures 22 (such as a keyboard and/or touchpad and/or touch screen) may be used to interact with the computer 10A, such as to start, control, or operate a GUI or applications running on computer 10A. For example, a keyboard and/or touchpad may allow a user to navigate a user interface or application interface (e.g., presentation application) displayed on display 18. Moreover, a touch screen may allow the user to draw (e.g., via finger or electronic pencil) a motion path.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif.

The handheld device 10B may include an enclosure 36 to protect interior components from physical damage and to shield them from electromagnetic interference. The enclosure 36 may surround the display 18, which may display a graphical user interface (GUI) having an array of icons 32. By way of example, one of the icons 32 may launch a spreadsheet application program (e.g., Keynote® by Apple Inc.). User input structures 22, in combination with the display 18, may allow a user to control the handheld device 10B. For example, the input structures 22 may activate or deactivate the handheld device 10B, navigate a user interface to a home screen, navigate a user interface to a user-configurable application screen, activate a voice-recognition feature, provide volume control, and toggle between vibrate and ring modes. Touchscreen features of the display 18 of the handheld device 10B may provide a simplified approach to controlling the presentation application program and/or drawing motion paths for an object on a presentation slide. The handheld device 10B may include I/O interface 24 that opens through the enclosure 36. The I/O interface 24 may include, for example, an audio jack and/or a Lightning® port from Apple Inc. to connect to external devices, such as speakers and/or headphones.

FIG. 4 depicts a front view of a handheld tablet device 10C, which represents another embodiment of the electronic device 10. The handheld tablet device 10C may represent, for example, a tablet computer, or one of various portable computing devices. By way of example, the handheld tablet device 10C may be a tablet-sized embodiment of the electronic device 10, which may be, for example, a model of an iPad® available from Apple Inc. of Cupertino, Calif. The handheld tablet device 10C may also include an enclosure 36 that holds the electronic display 18. Input structures 22 may include, for example, a hardware or virtual home button.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D. In one embodiment, the input structures 22 (e.g., a keyboard and/or touchpad and/or touchscreen) may be used to interact with the computer 10D, such as to start, control, or operate a GUI or applications (e.g., Keynote® by Apple Inc.) running on the computer 10D.

Similarly, FIG. 6 depicts a wearable electronic device 10E representing another embodiment of the electronic device 10 of FIG. 1 that may be operate using the techniques described herein. By way of example, the wearable electronic device 10E, which may include a wristband 43, may be an Apple Watch® by Apple, Inc. More generally, the wearable electronic device 10E may be any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Electronic devices 10A, 10B, 10C, 10D, and 10E described above may each use a presentation application with an object on a presentation slide that may be animated to follow a freehand and/or straight line motion path. In some embodiments, an associated tray may indicate each action (e.g., a motion path) applied to the object. Moreover, upon selection of each action in the tray, context-specific properties may be edited.

With the preceding in mind, a variety of computer program products, such as applications and/or operating systems executing on an electronic device 10, may use or implement the techniques discussed below to enhance the user experience on the electronic device 10. While the following examples are provided in the context of a presentation application, the present approaches are suitable for use in other applications that provide for the display and manipulation of objects (e.g., texts, shape, pictures, etc.), such as a word processing application or applications with a slide or slide canvas. For example, an electronic device 10 may store and run a presentation application (e.g., Keynote® from Apple Inc.) or other suitable application configured to implement the freehand or straight line motion paths for an object to follow and to provide the associated tray indicating actions applied to the object.

As used herein, a "slide" should be understood to refer to a discrete unit of a presentation, which may or may not be ordered or sequential in nature. Such a slide, therefore, may be understood to function as a canvas for a set of objects (as discussed below) that together convey information about a topic of a presentation. For example, each slide may contain or include different types of objects that explain or describe a concept to which the slide is directed. Further, because a slide may include multiple objects, a slide may have an associated z-ordering of those objects as they are displayed on the slide. That is, to the extent that objects on the slide may overlap or interact with one another, they may be ordered or layered with respect to a viewer such that some objects are on top of or beneath other objects as they appear on the slide.

Further, as used herein, the term "object" may be understood to refer to any discretely editable component on a slide of a presentation. That is, something that can be added, altered, and/or edited on the slide (e.g., change its location, orientation, etc.), may be described as an object. Examples of objects may include, but are not limited to, text objects, image objects, video objects, chart/graph objects, shape objects, audio objects, and so forth. By way of example, a clip-art image that may be provided on a slide, may constitute an object. Similarly, a character or string of characters (text or numbers) may constitute an object. Therefore, in some embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein.

Generally, the presentation application may include multiple modes, such as an editing mode, an action build mode, and drawing mode. In the editing mode, the presentation slides may viewed and edited. For example, actions applied to an object may be viewed and their context-specific properties (e.g., duration of the selected motion path) may be edited. Moreover, additional actions may be applied to an object. Upon a selection to add an action, a user may enter action build mode.

In the action build mode, a user may apply actions (e.g., effects) to the objects on a slide, such as by designating an action build (e.g., one or more ordered actions) for a selected object, and the object may be animated during presentation of the slide based on the action build. For example, while a slide is being presented, the objects on the slide may, in accordance with the build, be animated to appear, disappear, move across the slide, play (in the context of a video or audio object), or otherwise be animated in response to automated or user provided. In some embodiments, the action build mode may include a tray that indicates the actions applied to a selected object. Moreover, the actions may indicate the order or sequence in which they are applied.

Upon selection to add an action of a motion path, the user may enter a drawing mode. In the drawing mode, the user may draw the motion path using a freehand and/or straight line drawing tool. In some embodiments, the user may draw using other tools in addition to the freehand and/or straight line drawing tool. Once the slides of a presentation are designed and/or modified in the various modes using the techniques described herein, the presentation may be played by displaying one or more slides in sequence for viewing by an audience.

Figure 7:
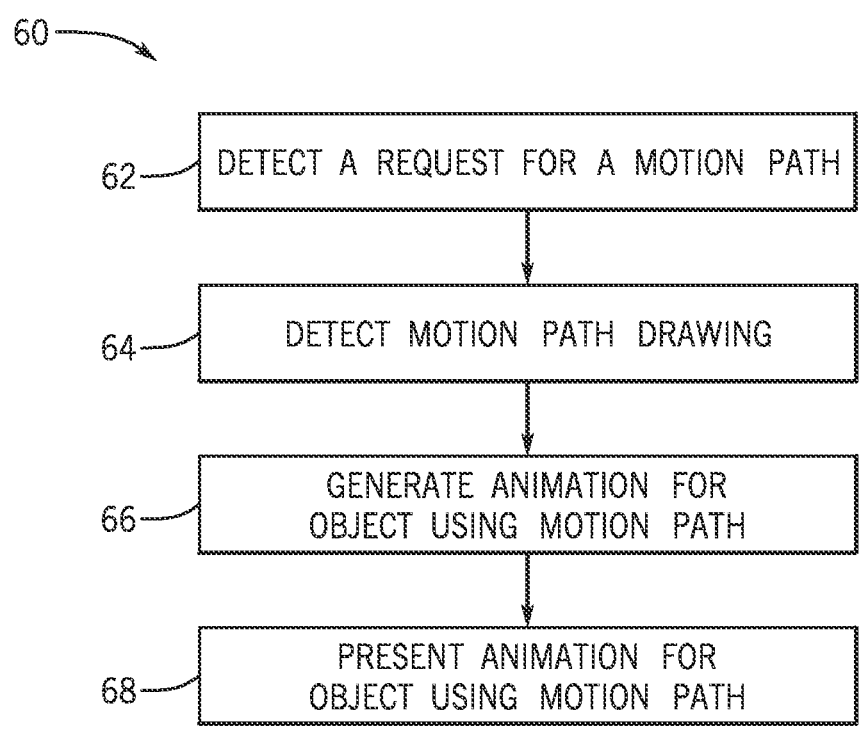
FIG. 7 is a process flow diagram, illustrating a process for creating a hand drawn motion path for the object on the presentation slide, in accordance with an embodiment of the present disclosure.

Turning now to a discussion of a presentation slide of a presentation application that may include an object, FIG. 7 illustrates a process 60 for creating a freehand or straight line motion path for the object. The process 60 may include detecting (block 62) a request for a motion path. In particular, while a user is in editing and action build modes on the presentation application, the user may select the object to be animated and select an option to apply an action, such as a motion path.

In response to selecting the option to apply a motion path, the user may enter the drawing mode. In the drawing mode, the user may select a drawing tool to draw a path. Once the user begins drawing, such as by selecting the object 82 and dragging the object 82 using the user's finger on a touch screen display 18, the process 60 may include detecting (block 64) motion path drawing. For example, the user may select a freehand drawing tool to draw a freehand (e.g., nonlinear) path and then select the object 82. The path may continue being generated so long as the user is dragging the object 82 to create the motion path and/or until a completion action is observed (e.g., a second mouse click). Upon letting go of the object 82, such as by removing or lifting the user's finger on the touch screen display 18, and/or providing another completion action, the process 60 may determine that drawing of the motion path is complete.

After detecting the motion path drawing is complete, the process 60 includes generating (block 66) animation for the object using the motion path created by the user. For example, as the user drags the tool in a freehand motion across the presentation slide, an algorithm may process the motion path and create the corresponding animation for the object to follow. This may be done by generating intermediate frames of the object along the motion path, simulating movement of the object. Upon completing the generation of the animation for the object along the motion path, the process 60 includes (block 68) presenting the animation for the object using the motion path. For example, the presentation may include a preview of the object following the generated motion path. Further, the animation may be presented in a presentation mode upon a proper animation trigger. Additional details with regard to the process 60 undertaken by the user to draw the particular motion path will be discussed below with reference to FIGS. 8-9E.

After the motion path has been completed, the user may choose to modify the path, such as by adding extension paths. Details with regard to the process undertaken by the user to add extension paths will be discussed below with reference to FIGS. 10A-11. Upon completion of the motion path and after viewing the presentation, the user or presenter may want to modify the existing motion path applied to the object to provide a more effective presentation. To do so, and as discussed in detail with reference to FIGS. 12-18D, the user may modify or adjust the path by adding new motion path segments, changing path segment shapes, splitting path segments, deleting path segments, etc. Additionally or alternatively, context-specify properties of the actions applied to the object may be edited, as discussed in detail with reference to FIG. 19.

Figure 8:
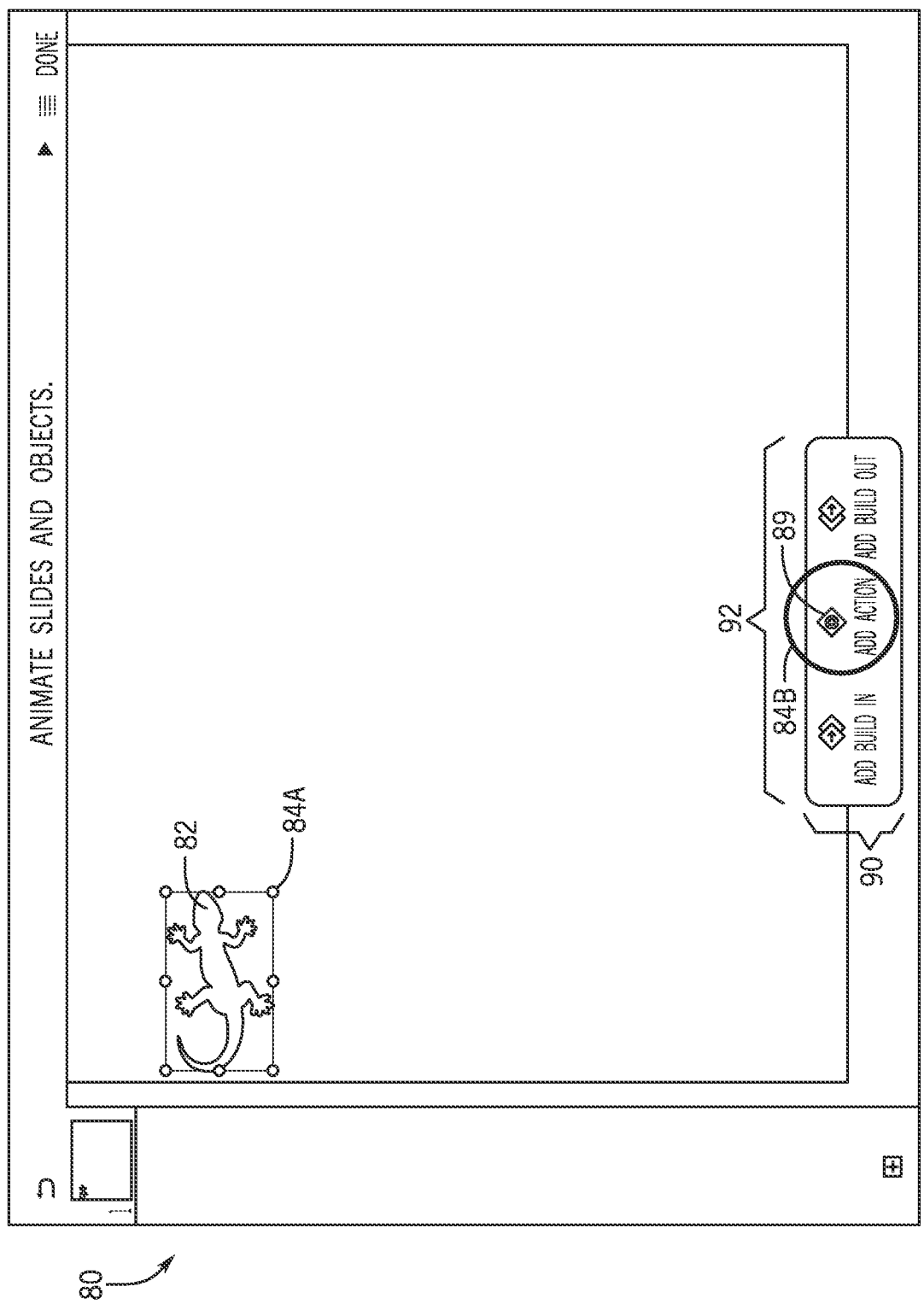
FIG. 8 is a block diagram of a request to add an action to a selected object in an editing mode, in accordance with an embodiment of the present disclosure.

With the foregoing in mind, FIG. 8 illustrates a block diagram depicting an object 82 (e.g., gecko shape) on a slide in editing mode 80. In editing mode 80, actions or animations that have been applied to objects 82 on the slide may be viewed. In particular, upon selection of the object 82, an editing tray 91 may indicate one or more action builds 92 that are presently applied to the selected object 82. In some embodiments, such as the depicted example, the editing tray 91 may include an "add action" 89 action build 92 that may be applied to the object 82 when no actions are presently applied.

In the current implementation, object 82 is placed on the slide but no actions have been applied to it. Thus, a user may select 84A the object 82, such as by clicking or tapping, to facilitate applying an action build 92 in the editing tray 91. Here, the user requests to add an action by selecting 84B the "add action" 89 action build 92.

Figure 9A:
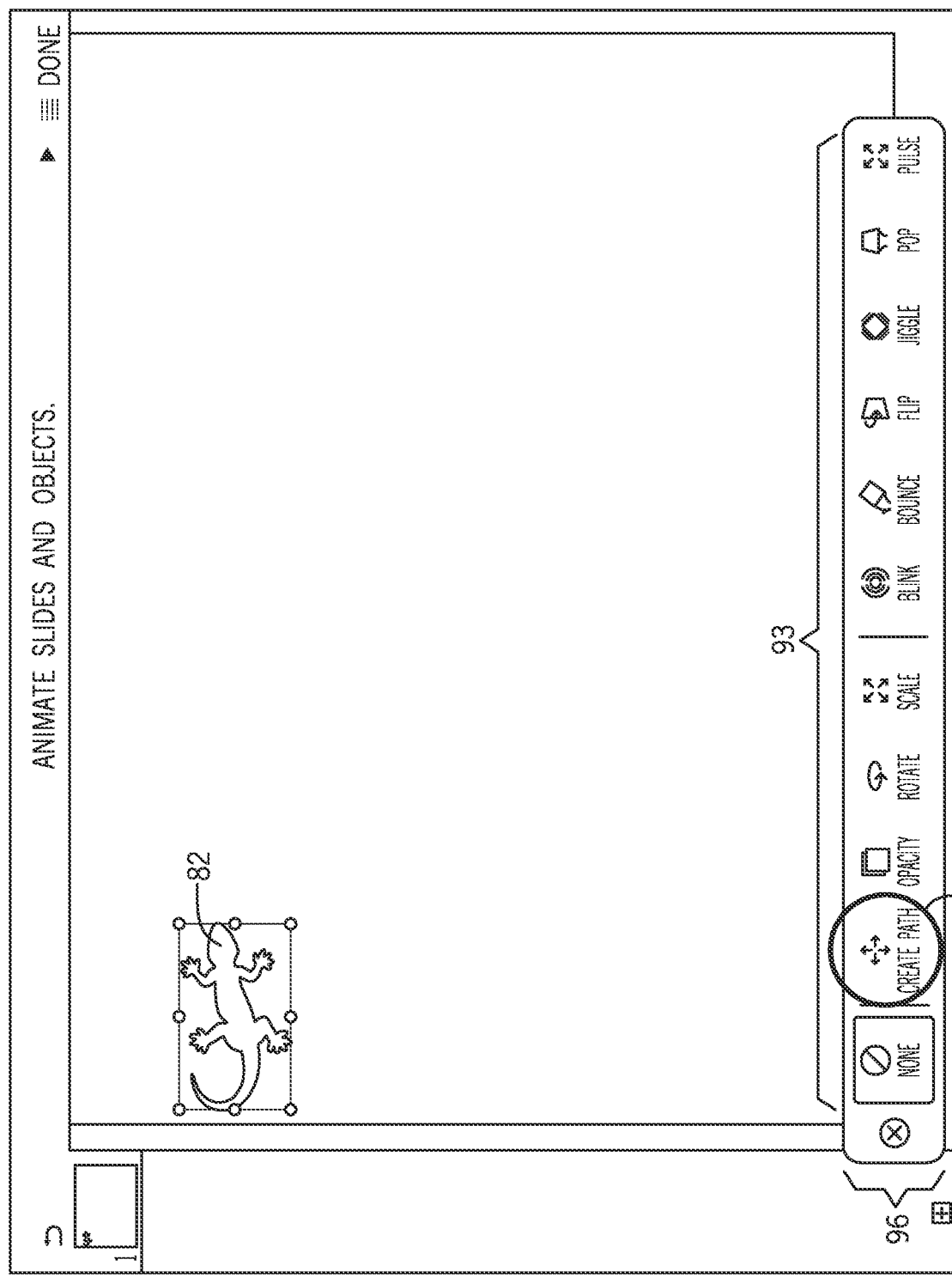
FIG. 9A is a block diagram of the object in an action build mode in response to the request to add an action to the object of FIG. 8, in accordance with an embodiment of the present disclosure.

As shown in FIG. 9A, upon selecting 84B the "add action" 89 action build 92, the user enters action build mode 90. In the action build mode 90, the user may continue to view the selected object 82. Similar to the editing tray 91, the action build mode 90 includes an action build tray 96. The action build tray 96 indicates the various action options 93 that may be applied to the object 82. For example, the object 82 may be animated using the various action options 93, including, but not limited to, the "create path" action options 93. The create path option may allow the object 82 to follow a particular motion path. Thus, a tray and its options may correspondingly update between or based on the present viewing mode (e.g., editing mode 80, action build mode 90). In the current embodiment, the user selects 84 the "create path" action option 93 to apply a user designed motion path.

As shown in FIG. 9B, upon selecting 84B the "create path," action option 93, the user enters a drawing mode 100, which allows the user to draw the motion path. The drawing mode 100 may include a drawing tray 102 with drawing options 104. As shown, the drawing options 104 may include a freehand drawing tool 106 (e.g., tool for drawing smooth, nonlinear lines), a straight line drawing tool 107 (e.g., tool for drawing sharp, straight lines), a "clear" drawing option 103 to remove a drawn path, and a "done" drawing option 105 to finalize the motion path. As previously described, after the motion path has been drawn and generated, the motion path may be used to present the animation to the user (e.g., block 68 of FIG. 7), such as by providing a preview of the object 82 following the motion path. In some instances, the user may determine that a different motion path may be a more effective animation for the object 82, and thus, may want to clear the presented motion path. Accordingly, the user may use the "clear" drawing option 103 to clear the presently drawn motion path. Alternatively, if the animation is determined to be effective, the user may select the "done" drawing option 105 to finalize the motion path in drawing mode 100. In depicted embodiment, the user selects 84 the freehand drawing tool 106.

Figure 9C:
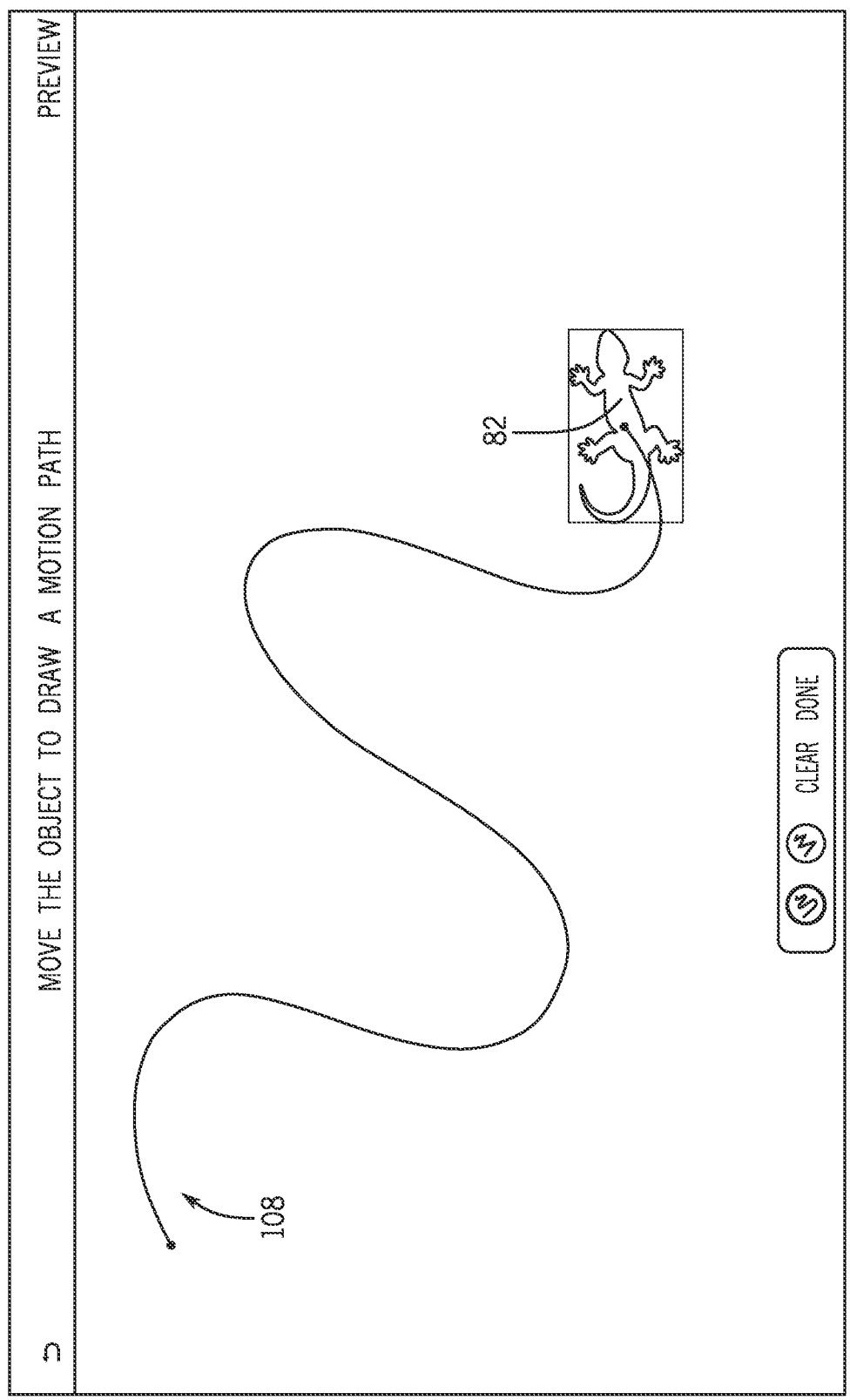
FIG. 9C is a block diagram of the motion path created using a free hand tool in the drawing mode of FIG. 9B, in accordance with an embodiment of the present disclosure.

FIG. 9C illustrates the motion path 108 created using the freehand drawing tool 106. As shown by the depicted motion path 108, the freehand drawing tool 106 allows the user to draw a freehand linear, smooth, and/or curved motion path for the object 82. As previously mentioned, the animation for the motion path 108 may be generated while the user is drawing the motion path 108.

Figure 9D:
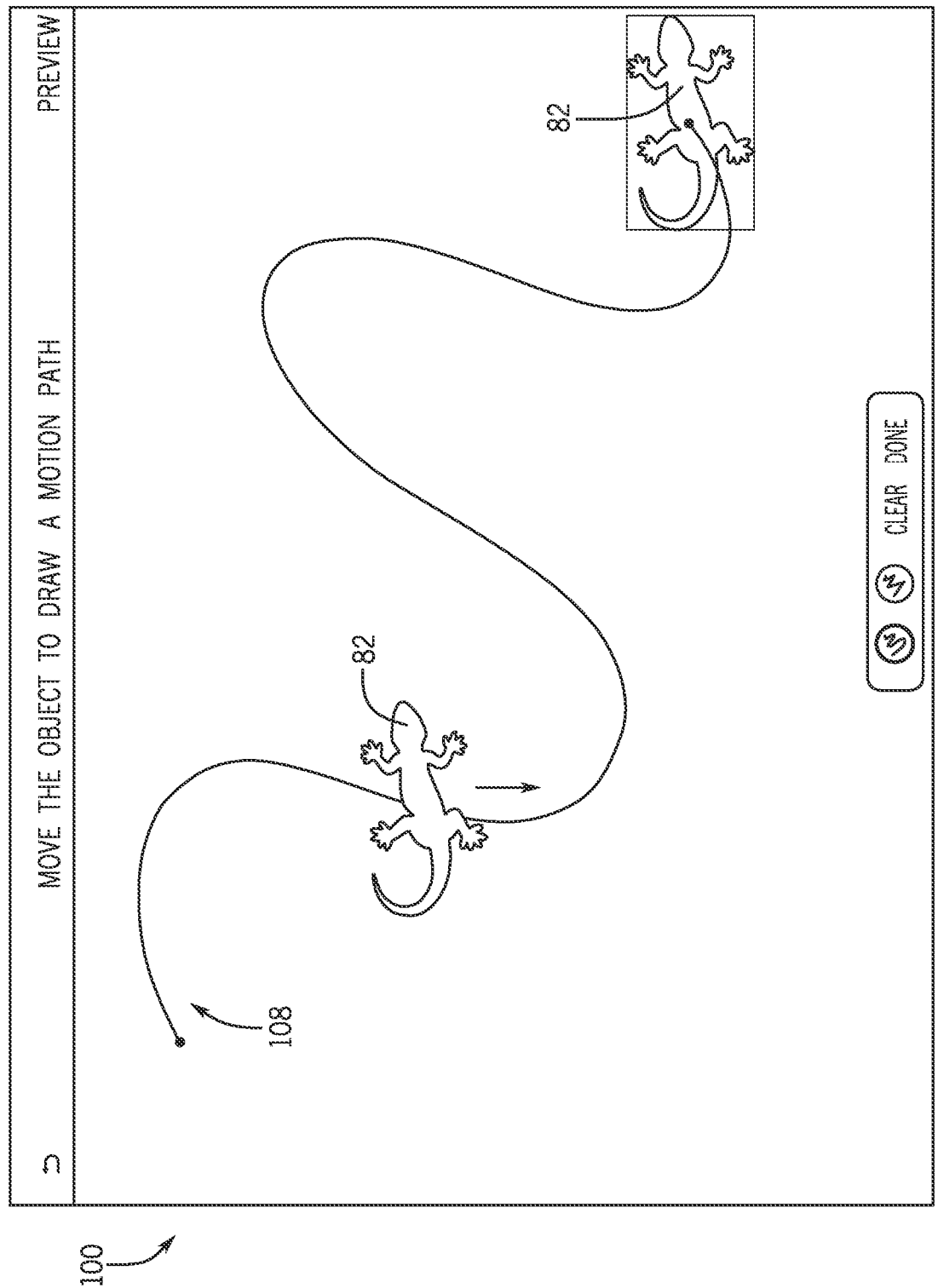
FIG. 9D is a block diagram of presenting the animation for the object using the motion path of FIG. 9C, in accordance with an embodiment of the present disclosure.

After the user is no longer drawing the motion path, (e.g., the user lifts finger/pencil used for drawing) the animation for the object 82 may be presented, as shown in FIG. 9D. As illustrated, the presentation of the motion path 108 in drawing mode 100 includes the object 82 following along the motion path 108, from the beginning point to the end point. A dynamic number of animation frames used to animate the object 82 over the motion path 108 may be determined based upon a number of factors. For example, processing power of the underlying computer, document sizing, etc. Though the current figure shows a preview of the animation along the motion path 108, upon actual presentation, the motion path 108, in some embodiments, may not be rendered while the object 82 moving along the motion path 108.

Additionally or alternatively to the freehand drawing tool 106, the user may use the straight line drawing tool 107 from the drawing options 104, as illustrated in FIG. 9E. As shown, the motion path 108 drawn using the straight line drawing tool 107 may include various straight segments or sharp lines rather than the smooth, nonlinear paths that may be drawn using the freehand drawing tool 106. However, after the user has finished drawing the present motion path 108 (e.g., lifted finger off touch screen display 18 or provided another end-drawing trigger action), the user may decide to extend the existing motion path 108. Accordingly, the user may select 84A the object 82 to add a new motion path 108 extension to the current motion path 108.

Figure 10:
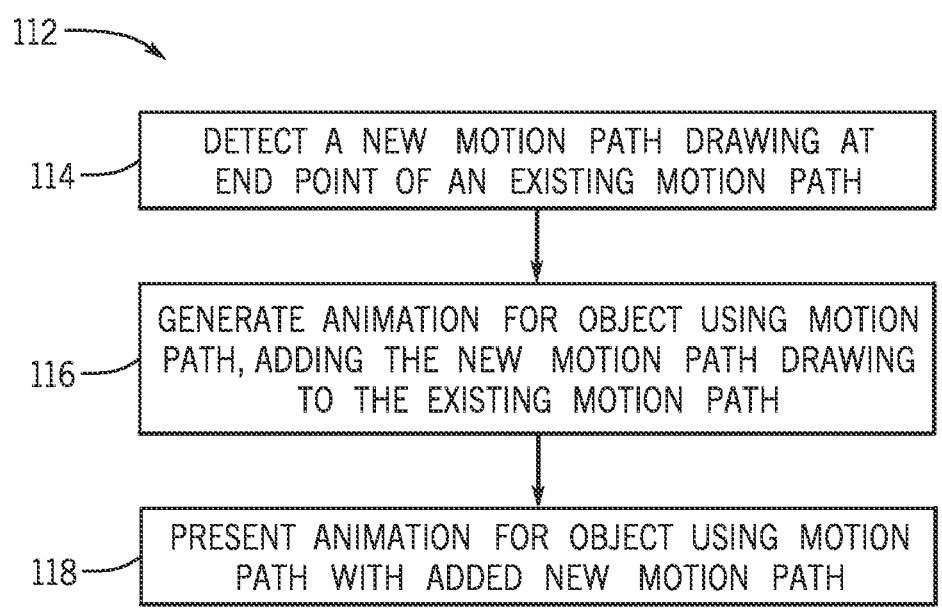
FIG. 10 is a process flow diagram, illustrating a process for creating a new motion path extension, in accordance with an embodiment of the present disclosure.

To illustrate, FIG. 10 is a flow diagram of a process 112 for creating a new motion path 108. The process 112 may include detecting (block 114) a new motion path 108 drawing at an end of an existing motion path 108. As previously discussed, after the user has finished drawing, the animation may be presented, such that the object 82 follows the existing motion path 108 from the beginning of the motion path 108 to the end of the motion path 108. Thus, the presentation may place the object to be located at the end of the motion path 108 when the presentation has finished. The user may select the object 82 at its present location (e.g., end of motion path 108), which may indicate that subsequent actions may be applied to the present location of the object 82. The user may begin to draw another motion path 108, such as by using a finger on the touch screen display 18. In this manner, the user may add additional or extension motion path 108 after previewing the animation with the existing motion path 108.

While the user draws the new motion path 108, the process 112 may include generating (block 116) animation for the object 82 using the motion path 108, adding the new motion path 108 drawing to the existing motion path 108. Since the user is still drawing, the user may be allowed to effectively continue the existing motion path 108 where it was left off or completed. In this manner, an object may smoothly transition along the existing motion path 108 and one or more extension motion paths 108. Further, the process 112 may include presenting (block 118) the animation for the object 82 using the motion path 108 with the added new motion path 108. In this manner, the object 82 is animated to follow along the existing motion path 108 and then along the added new motion path 108. Specifically, the new motion path 108 extension may not cause the animation of the object 82 to pause, but rather presents the existing motion path 108 and the new motion path 108 extensions as if they were drawn in a single instance of drawing.

To illustrate, FIG. 11A depicts adding a new motion path 108 extension to an existing motion path 108. An existing motion path 108 within the approximate parameters of a first dashed box 119 may include a straight line motion path 108. However, the new motion path 108 that is indicated to be within approximate parameters of a second dashed box 120, may include a freehand motion path 108. Thus, a user may add one or more extension motion paths 108 to the existing motion path 108 and/or switch between the freehand drawing tool 106 and straight line drawing tool 107 when creating or adding new motion paths 108. Here, the user selected 84 the object 82, and upon selection, the freehand drawing tool 106 is automatically selected. Thus, the user adds the freehand motion path 108 to the existing straight line motion path 108. Moreover, in some embodiments, the drawing options 104 for drawing an extension motion path 108 may default to the drawing tool used for the last motion path 108.

Figure 11B:
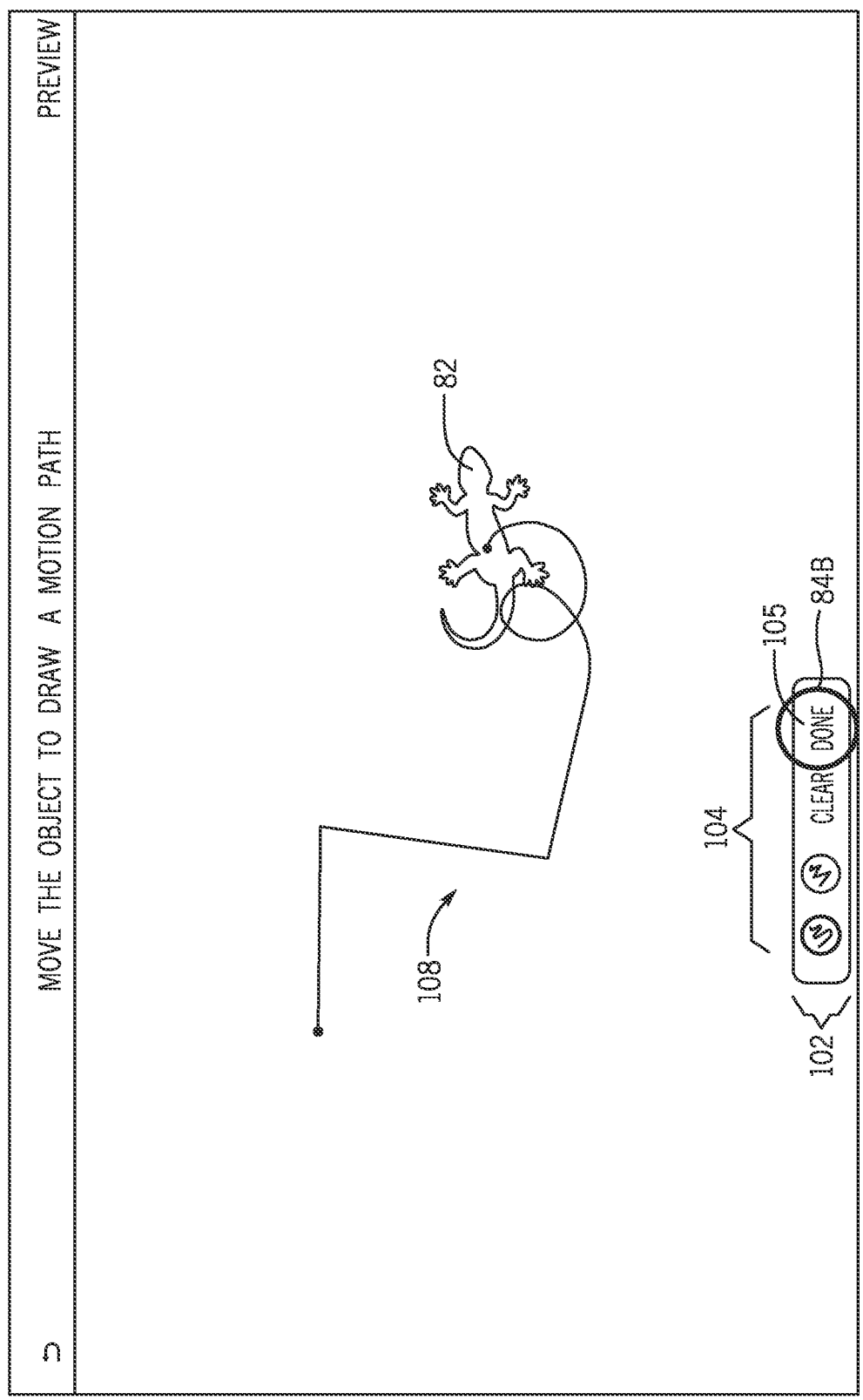
FIG. 11B is block diagram of a request to mark a motion path as complete and exit drawing mode, in accordance with an embodiment of the present disclosure.

After drawing the new extension motion path 108, the user may select 84A the object 82 to continue adding new motion paths 108, clear the last extension motion path 108, or complete the action of creating the motion path 108. To illustrate, FIG. 11B depicts a user selecting 84 the "done" drawing option 105 in the drawing tray 102. The "done" drawing option 105 may indicate that the presently drawn motion path 108 is complete. Accordingly, the user may exit from drawing mode 100 and back to action build mode 90.

After the user is back in action build mode 90, the viewer may view the actions applied to a selected object 82, such as the motion path 108. However, the user may find adding more actions or animations may make the presentation more effective. For example, the user may find that applying a new action (e.g., another motion path) but pausing the object 82 for emphasis as it proceeds along to the new action, may be a more effective form of communication of the topic than if the object 82 was to follow a longer, continuous animation (e.g., existing motion paths 108 with extension motion paths 108). Accordingly, the user may add a new action, such as a motion path 108, along with a new key frame.

Figure 12:
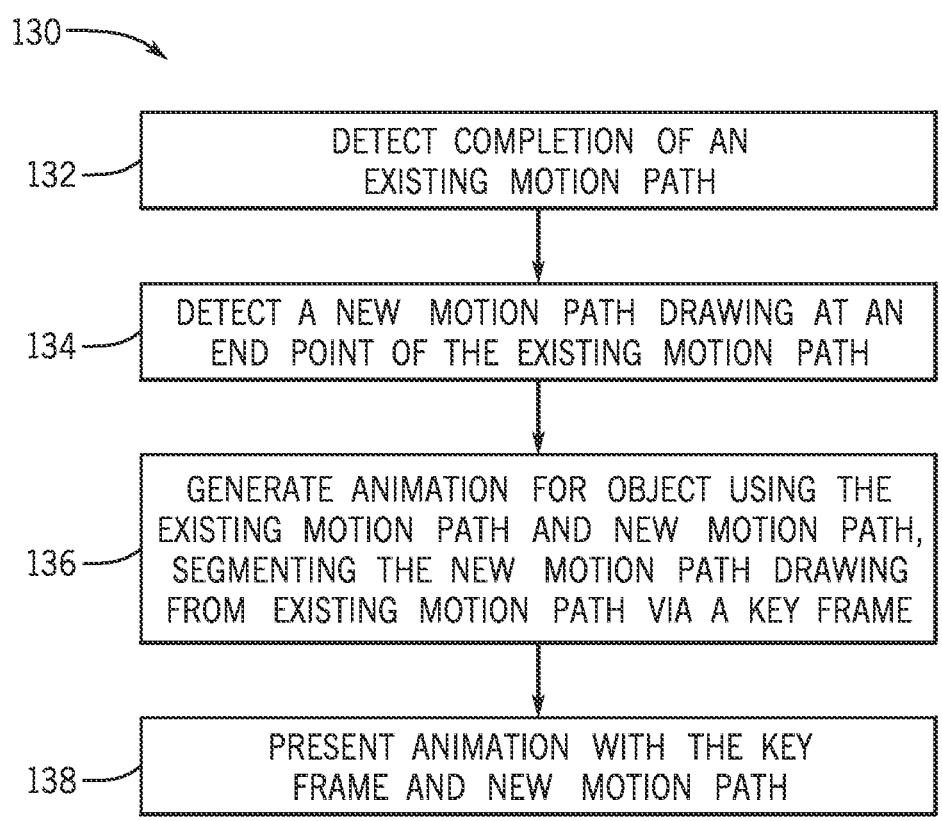
FIG. 12 is a process flow diagram, illustrating a process for adding a new motion path segment to an existing motion path, in accordance with an embodiment of the present disclosure.

To illustrate, FIG. 12 depicts a process flow diagram for a process 130 for adding a new motion path segment to an existing motion path segment. The process 130 may include detecting (block 132) completion of an existing motion path 108. For example, after a user has finalized drawing a motion path 108 in drawing mode 100, the user may select the "done" drawing option 104 in the drawing tray 102. Selecting "done" for the existing motion path drawing and existing drawing mode 100 to reenter action build mode 90, may indicate completion of the existing motion path 108.

The user may then select the object 82 in the action build mode 90, and apply a new action to the object 82, such as the new motion path 108 segment. Upon the request to create a new motion path 108, the user may enter drawing mode 100 to draw the new motion path 108. In drawing mode 100, the process 130 may include (block 134) detecting a new motion path 108 drawing at an end point of the existing motion path 108. In this manner, the new motion path 108 segment is added at the point at which the existing motion path 108 segment was completed.

Upon completing the drawing (e.g., lifting finger or pencil used for drawing on a touch screen display 18), the process 130 may include generating (block 136) animation for the object 82 using the existing motion path 108 and new motion path 108, while segmenting the new motion path 108 drawing from the existing motion path 108 drawing via a key frame. Thus, the addition of the new motion path 108 to the existing motion path 108 may provide a noticeable transition between key frames. For example, the object 82 may pause between key frames (e.g., key frame with object at the end of the existing motion path 108 and the key frame with the object at the beginning of the new motion path 108) for a predetermined time period (e.g., 1 second) or may require an additional movement trigger (e.g., click or tap) to continue movement along the rest of the motion path after the keyframe.

After the generating the animation, the process 130 may present (block 138) the key frame and new motion path 108. The object may follow along the path of both motion paths 108 with a noticeable transition between key frames.

Figure 13A:
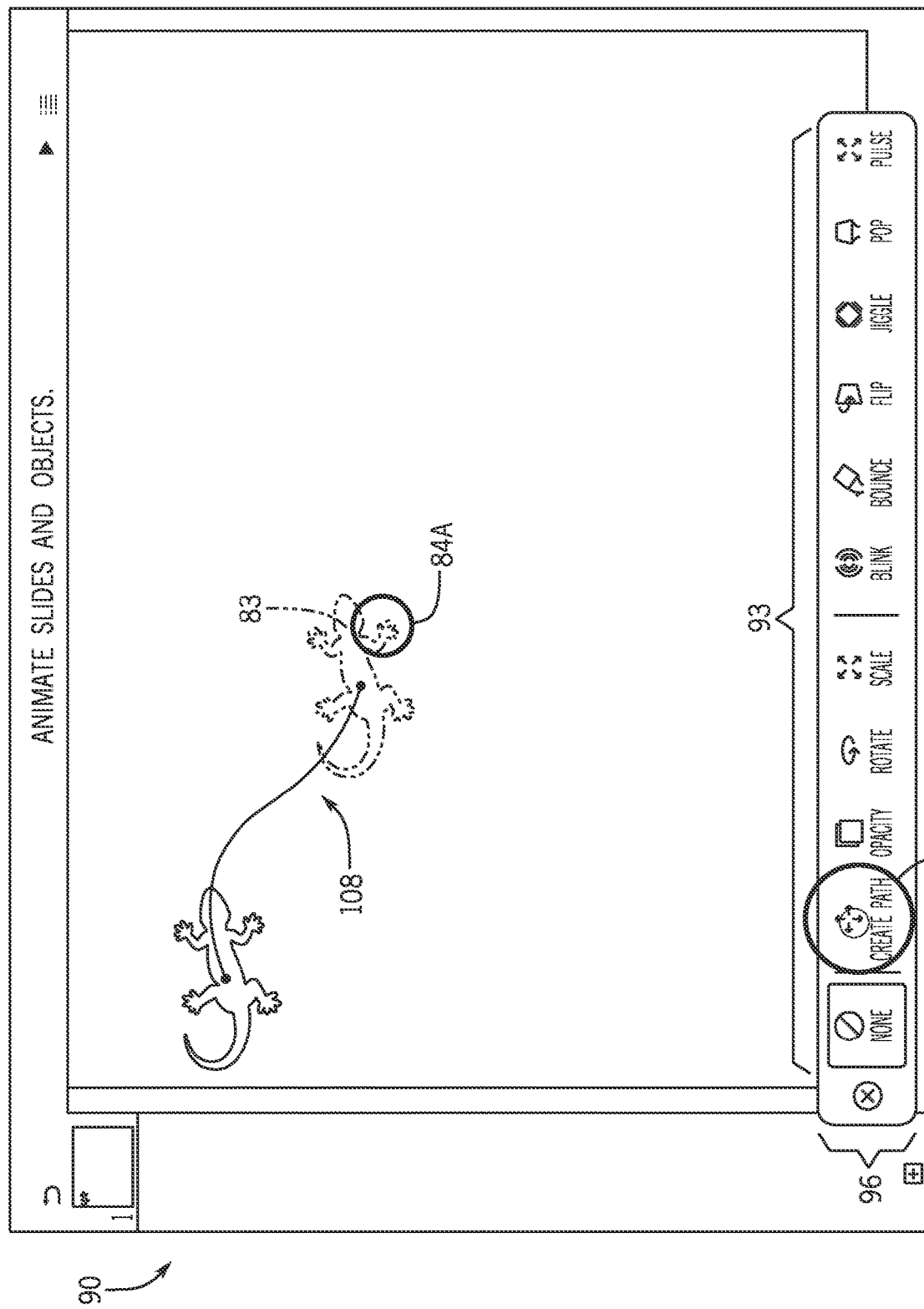
FIG. 13A is a block diagram of a request to add a new segment to an existing motion path, in accordance with an embodiment of the present disclosure.

To illustrate, FIG. 13A depicts a block diagram of the user in action build mode 90 requesting to add a new motion path 108 segment to an existing motion path 108. In general, the user may add one or more new action options 93 from the action build tray 96 to add to the animation of object 82. Here, the user requests to apply a new motion path 108 to the existing motion path 108. To add the new motion path 108, the user selects 84A an object ghost 83 and then selects 84B the "create path" action option 93. The ghost 83 may refer to a translucent image of object 82 and indicate the object's end point (e.g., end of motion path 108) for a single action option 93. Thus, an animation for the object 82 that includes multiple action options 93 (e.g., multiple motion paths 108) may include multiple ghosts 83.

Figure 13B:
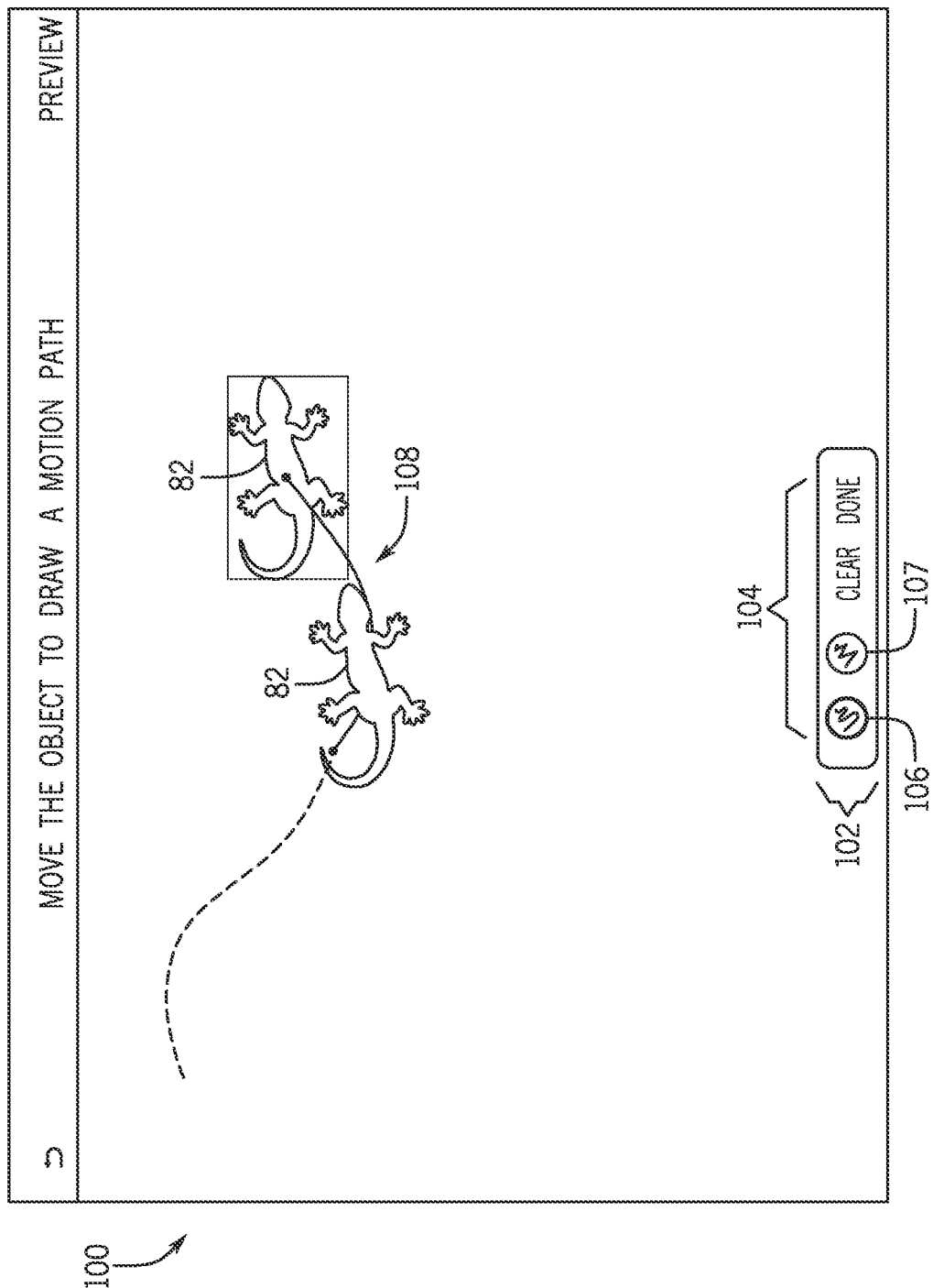
FIG. 13B is a block diagram of the new segment motion path of FIG. 13A, in accordance with an embodiment of the present disclosure.
Figure 13C:
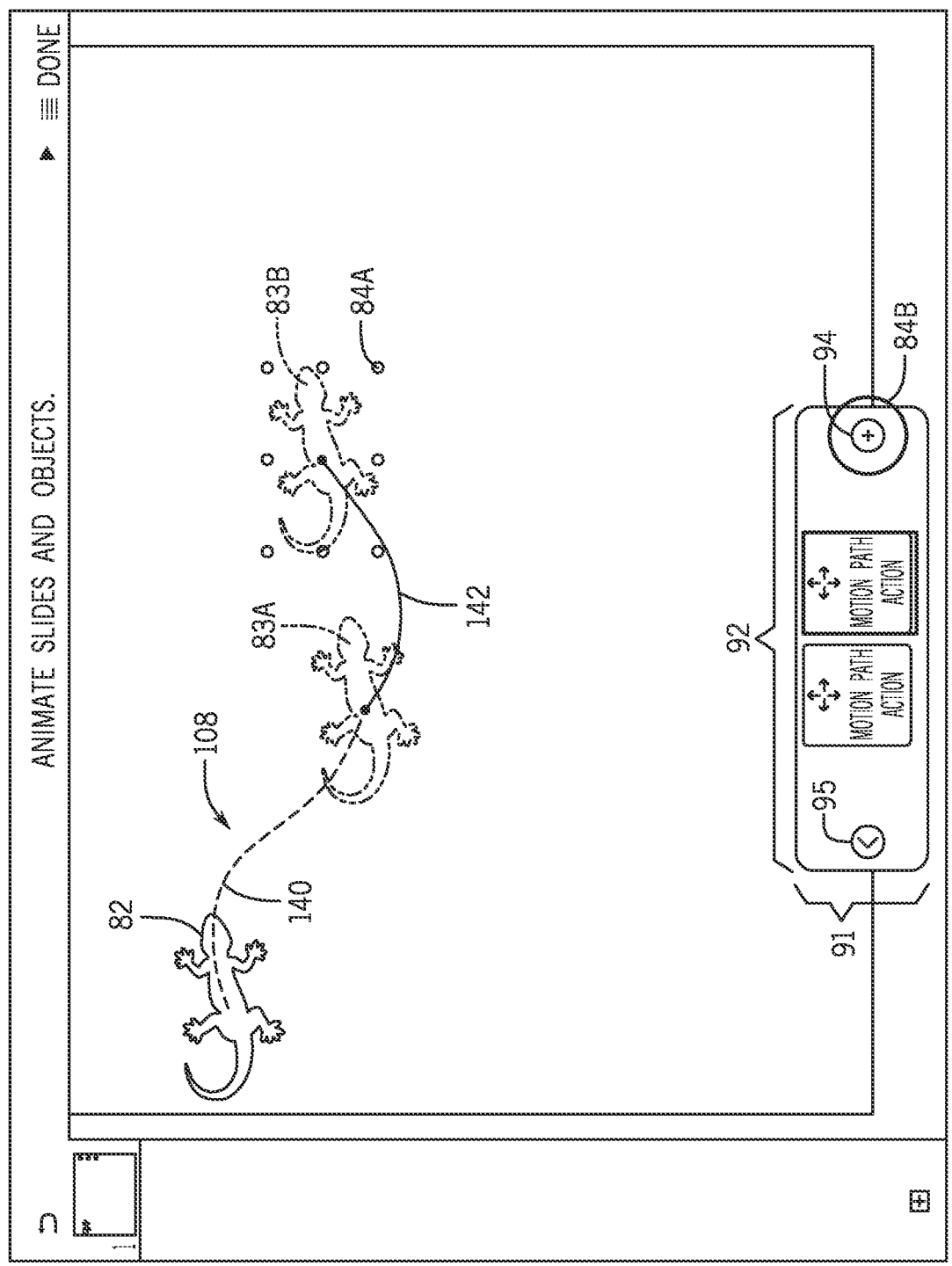
FIG. 13C is a block diagram of the multiple segments in the motion path of FIG. 13B, in accordance with an embodiment of the present disclosure.

Upon the selection to add the new motion path 108 segment, the user enters drawing mode 100 to draw the motion path 108, as shown in FIG. 13B. In the current embodiment, the new motion path 108 is drawn using the freehand drawing tool 106. However, in other embodiments, the user may draw the new motion path 108 with the straight line drawing tool 107. Moreover, other features of drawing the motion path 108 in drawing mode 100 as previously discussed, such as adding motion path 108 extensions (e.g., using the freehand drawing tool 106 and/or straight line drawing tool 107) without adding additional key frames, may be utilized for the new motion path 108 segment.

Furthermore, in some implementations, the existing motion path 108 may be included but inactive in the drawing mode 100, such that a user may preview both the existing motion path 108 and new motion path 108 segments together. In this manner, the user may accurately determine the most effective combination of both motion paths 108. As shown, the existing motion path 108 that is an inactive session (e.g., not being edited) may include a dash patterned drawing to indicate that the existing motion path 108 is inactive (not part of the current selection) as opposed to a solid drawing line for an active session. Moreover, the inactive session may be non-selectable, such that it may not be selected for editing in the present slide view (e.g., drawing mode 100). A non-selectable session may be indicated by a gray scale color. In other implementations, the indication for a non-selectable motion path 108 may be shown by a variation in color (e.g., lighter) and/or path weight (e.g., lighter weight) with respect to the drawing of the active session indicated by a solid line drawing. The active session may include the path presently drawn, such as the new motion path 108 segment being drawn.

After a user finalizes the new motion path 108. The user may exit and preview and/or run the animation for object 82 in editing mode 80. To detail, FIG. 13C indicates multiple segments of motion paths 108 applied to object 82 in editing mode 80. As shown, a ghost 83A is illustrated, indicating where an endpoint/key frame is found along the motion path 108. The key frame indicates where an animation will be split among trigger actions (e.g., a pause, a finger tap, etc.). Further, a ghost 83B illustrates the ending point of the object 82 along the motion path 108. Upon user selection of the ghost 83A, the segments corresponding to the particular object 82 may be illustrated by a solid or dashed pattern drawing to indicate a session status for editing. Similar to the inactive and active statuses of drawings in a drawing mode 100, the existing motion path 108 segments applied to the object 82 in editing mode 80 may be indicated as inactive (e.g., not selected for editing) to the user. For example, the indication may include a particular pattern and/or line color that is different than the active session for the new motion path 108 segment. Here, an existing segment 140 (e.g., existing motion path 108) is indicated by a dashed pattern line while a new segment 142 (e.g., new motion path 108) is indicated by the solid pattern line. Thus, these indications may show the various segments of motion paths 108 applied to the selected object 82 and their active/inactive status for editing.

Additionally, the entire motion path 108 includes two ghosts 83A, B. As previously mentioned, the ghosts 83B may indicate the end point for a particular action. Since the depicted embodiment includes two motion paths 108, the current embodiment includes two ghosts 83A, B. A ghost 83A of object 82 is indicated at the end point of the existing segment 140 and a ghost 83B is indicated at the end point of the new segment 142. Moreover, each ghosts 83A, B may be associated with a key frame, such that multiple ghosts 83A, B may indicate multiple respective key frames.

Furthermore, the editing tray 91 may include and/or indicate the actions included in the action build 92 (e.g., corresponding to action options 93 of the action build tray 96) applied to the selected object 82 and/or ghost 83A, B. Accordingly, in the current embodiment, the editing tray 91 may indicate multiple motion paths 108 for the various segments of motion paths 108 (e.g., existing segment 140 and new segment 142) as the action build 92 applied to the object 82. Moreover, actions associated with the selected object 82 and/or ghost 83A, B within the animation sequence for the object 82 may be indicated in the editing tray 91. For example, and as depicted, the indication for the selected ghost 83B includes highlighted "motion path" as its action build 92.

In some embodiments, a user may select 84B an add action button 94 to enter action build mode 90 and apply an action to the object 82. Additionally or alternatively, the editing tray 91 may include one or more scrolling options 95 to view additional actions that may be applied to the object 82 but that may not be viewable in the current editing tray 91 view. By way of example, and as depicted in the current embodiment, the editing tray 91 may allow a user to view a particular number of actions at a time (e.g., two at a time), such that if more than two actions are applied, the scrolling option 95 may be used to facilitate viewing of the additional actions of the action build 92. In the current embodiment, the user selects 84 the ghost 83B and then selects the add action button 94 to add additional actions to object 82. Upon selection, the user may add actions to the end of the key frame associated with the selected ghost 83B.

Figure 14:
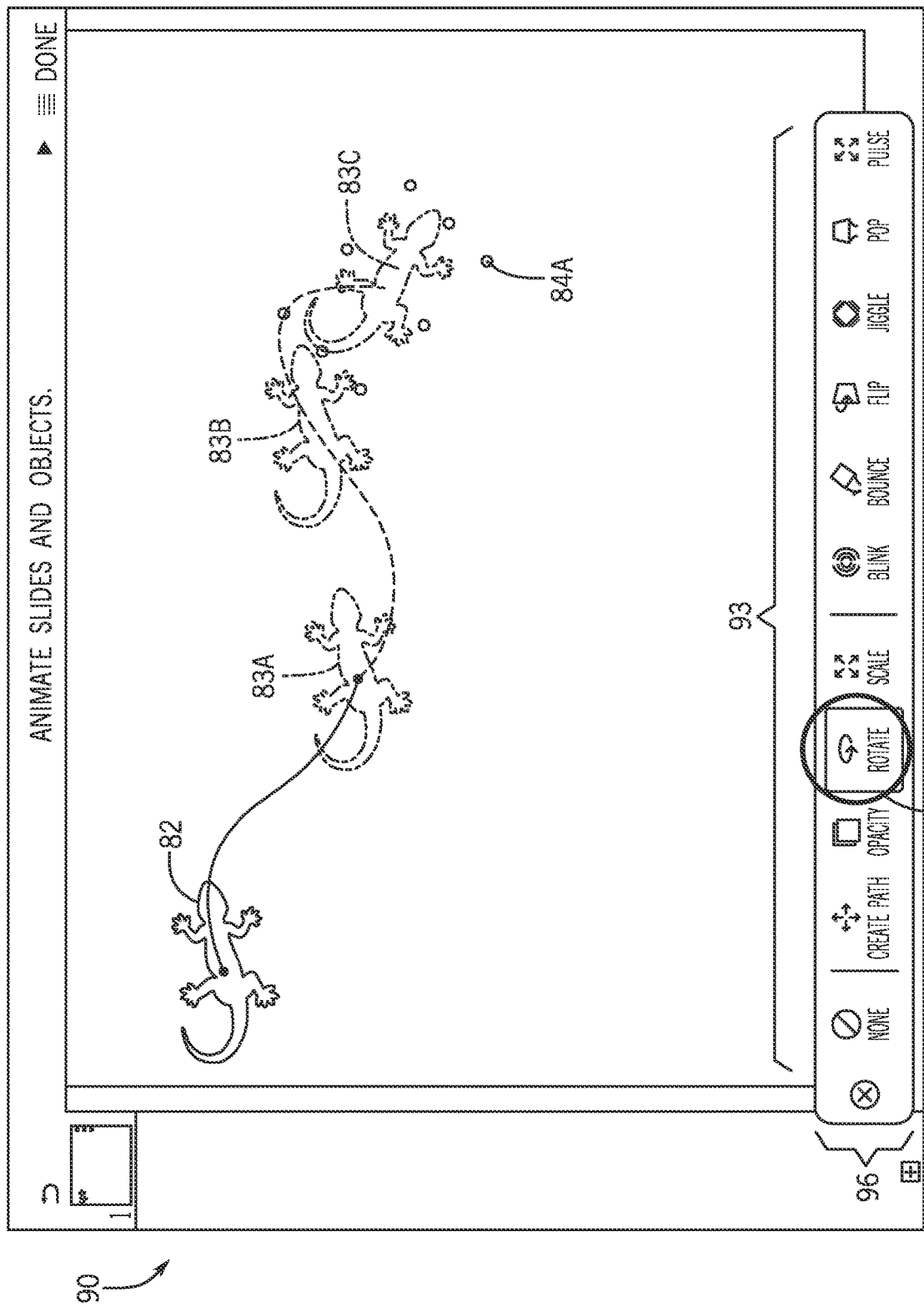
FIG. 14 is a block diagram of adding a rotate action to an object in the motion path, in accordance with an embodiment of the present disclosure.

After selection 84B of the add action button 94, the user enters action build mode 90 to add actions. By way of example, FIG. 14 illustrates the user selecting 84B a "rotate" action option of the options 93 in action build mode 90. As shown, the user selects 84A ghost 83A and then selects 84B the "rotate" action option of the options 93 in the action build tray 96. The rotate action may be directly applied or added to the action build sequence of the object 82 at the point at which the object 82 or ghost 83A, 83B, or 83C, here it is ghost 83A, is selected. In some embodiments, applying a new action, such as the "rotate" action option of the options 93, may create a new key frame, which may be indicated by a new ghost 83. Referring back to the editing tray 91 of FIG. 13C, the action build previously included two motion path 108 segments. However, after adding the "rotate" action, as depicted in FIG. 14, a new ghost, 83C, is added in the animation to indicate the new key frame. In some embodiments, if a rotation was applied to selected ghost 83A, then the rotation may trickle down from the selected ghost 83A to the remaining ghosts 83B, 83C. The user may apply additional animation features in a similar manner by selecting other action options from the options 93, such as create path, opacity, scale, blink, bounce, flip, jiggle, pop, and/or pulse.

Figure 15:
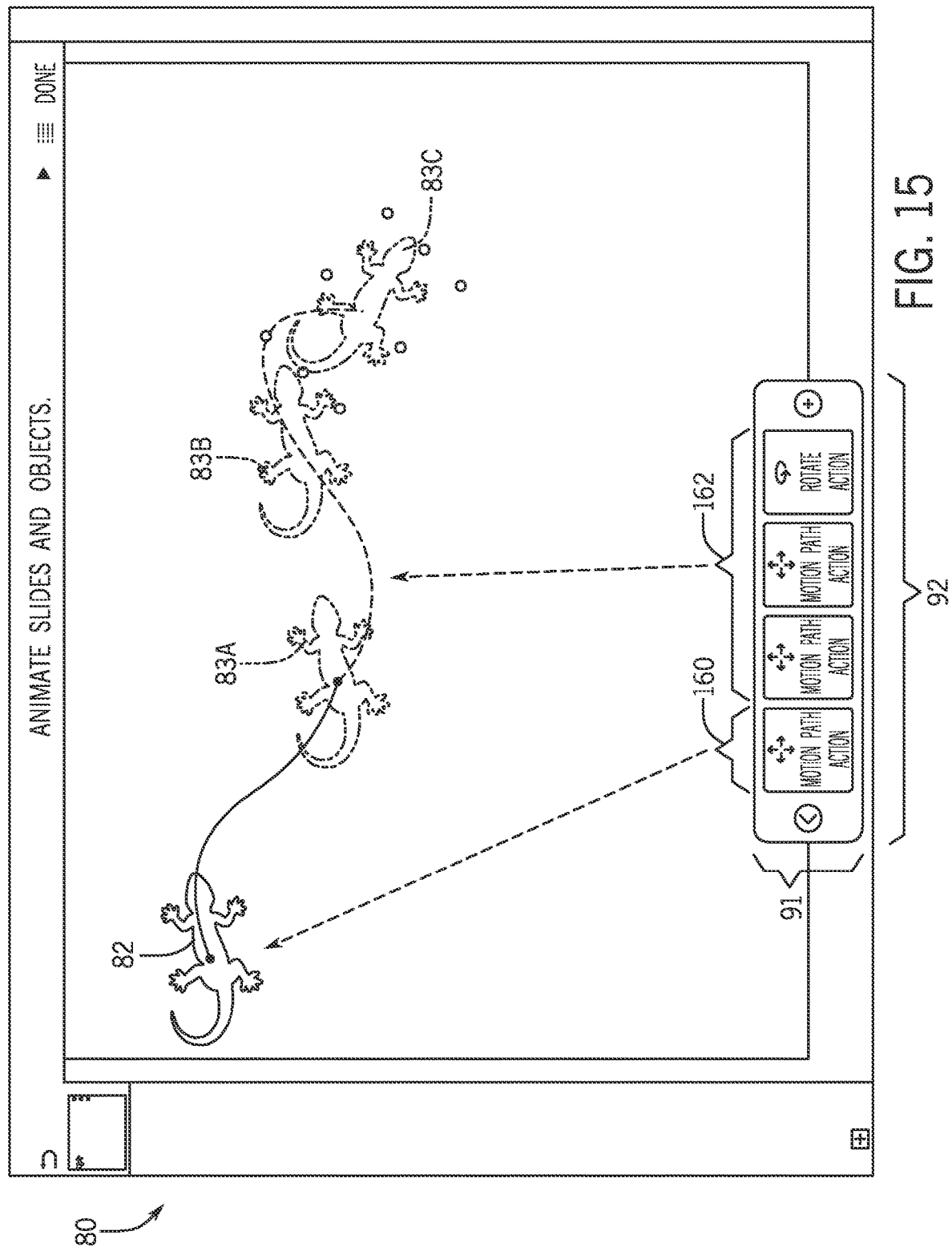
FIG. 15 is a block diagram of an action tray including an ordered summary of action options applied to the object, in accordance with an embodiment of the present disclosure.

The user may exit from action build mode 90 to enter back into editing mode 80. In editing mode 80, the user may view the action build 92 applied thus far to the object 82. To illustrate, FIG. 15 depicts a summary of the action builds 92 applied to the object 82 including the different segments of the entire motion path 108. As shown, a first segment 160 (e.g., existing segment 140 of FIG. 13C) corresponds to a "motion path" action build 92. However, as the object 82 moves along the motion path 108, a second segment 162 (e.g., new segment 142 of FIG. 13C) corresponds to two "motion path" and a rotation action build 92. Moreover, each of these actions (e.g., two motion paths and a rotation) in the second segment 162 are indicated by a respective ghost 83A, B, C. As a reminder, each ghost 83A, B, C may be associated with a key frame. Thus, in the depicted embodiment, the animation for the object 82 may include three key frames when presented.

Figure 16A:
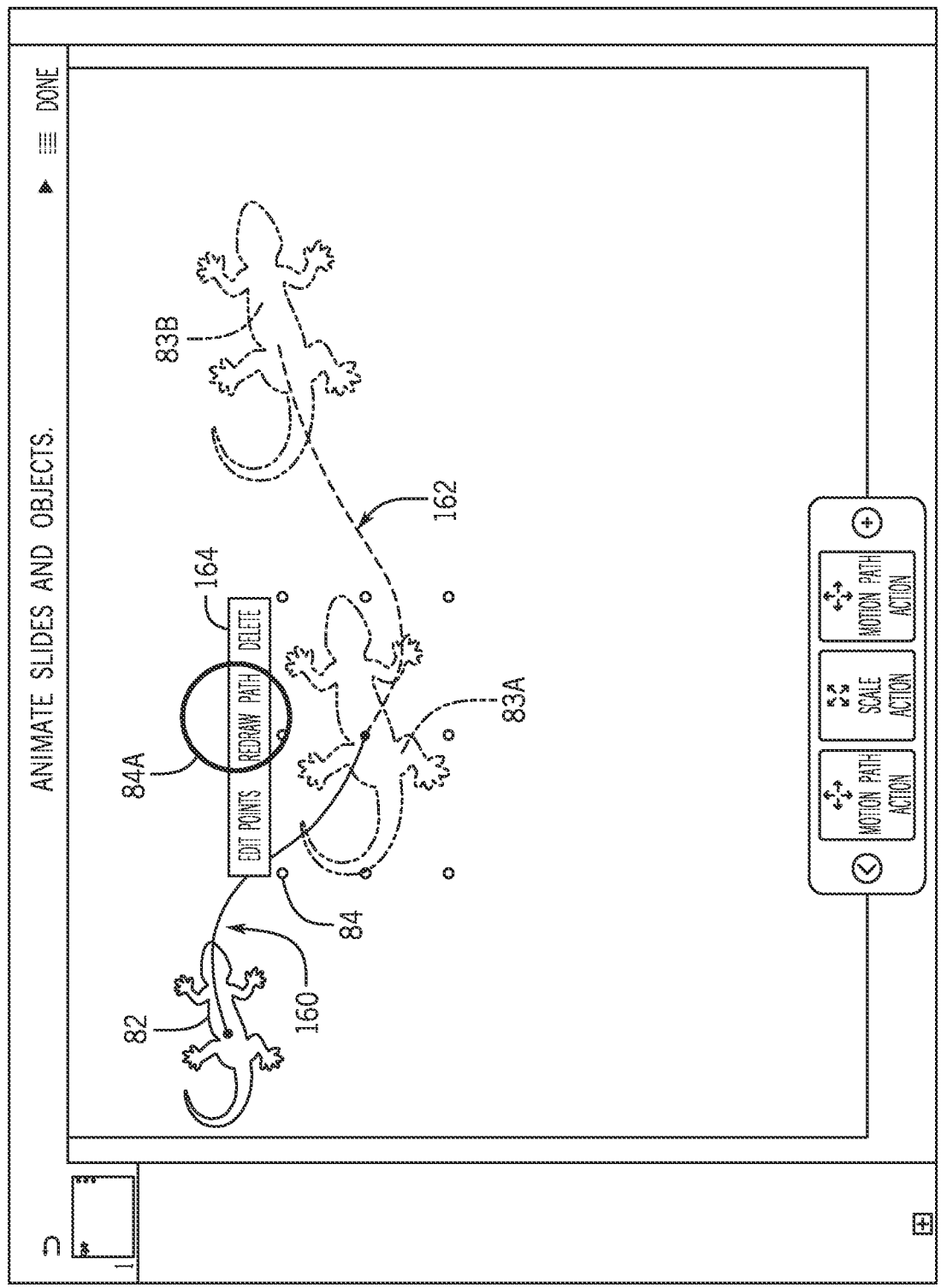
FIG. 16A is a block diagram of a request to redraw a segment of the motion path, in accordance with an embodiment of the present disclosure.

In some embodiments, redrawing a motion path 108 for the object 82 may provide a more effective presentation. To illustrate, FIG. 16A depicts a request to redraw a segment of the motion path 108. Specifically, the user may select 84 the object 82 or either of the ghosts 83A or 83B to select its corresponding segment (e.g., first segment 160 by selecting object 82 or ghost 83A and/or second segment 162 by selecting ghost 83B) of the motion path 108. For example, the selection of a segment to actively modify may be indicated by a solid line while inactive/unselected segments may be indicated by a dashed pattern drawing, as previously discussed. Upon selection 84, the user may request to edit, such as by tapping, double-clicking, or right-clicking, and an editing dialog box 164 with options to edit the associated segment may appear. Options may include "edit points," "redraw path," and "delete." The "edit points" option may allow a user to edit points along the path and these points may be used to reshape the motion path 108, as discussed in detail in FIGS. 17A-F. Additionally, the "redraw path" option may allow a user to redraw the selected segment while the "delete" option may allow the user to delete the segment of the motion path 108 from animation. In the current embodiment, the user selects 84 the "redraw" option for the selected first segment 160 of the motion path 108.

Figure 16B:
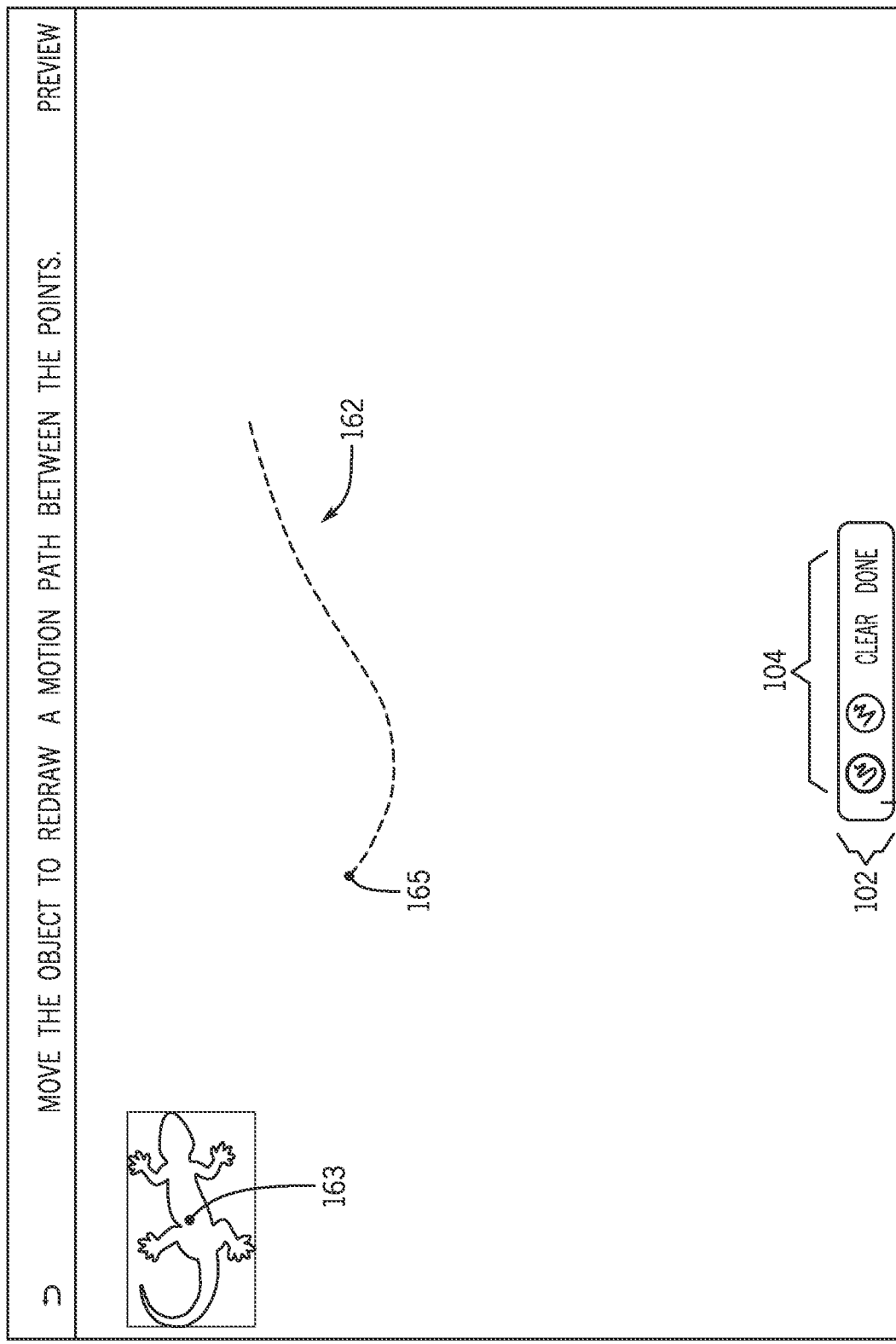
FIG. 16B is a block diagram of the segment removed and ready for redrawing in response to the request to redraw the segment of FIG. 16A, in accordance with an embodiment of the present disclosure.

After requesting to redraw the first segment 160, the user may enter drawing mode 100. In the drawing mode 100, the first segment 160 may be removed and ready for redrawing, as shown in FIG. 16B. However, a starting point 163 and an original endpoint 165 of the path being redrawn, such as the first segment 160, may stay the same despite the path being removed. In the current embodiment, the user selects or defaults the drawing options 104 in the drawing tray 102 to the freehand drawing tool 106. The user may then begin redrawing the first segment 160. Moreover, the second segment 162 is included for reference and indicated as an inactive drawing session.

Figure 16C:
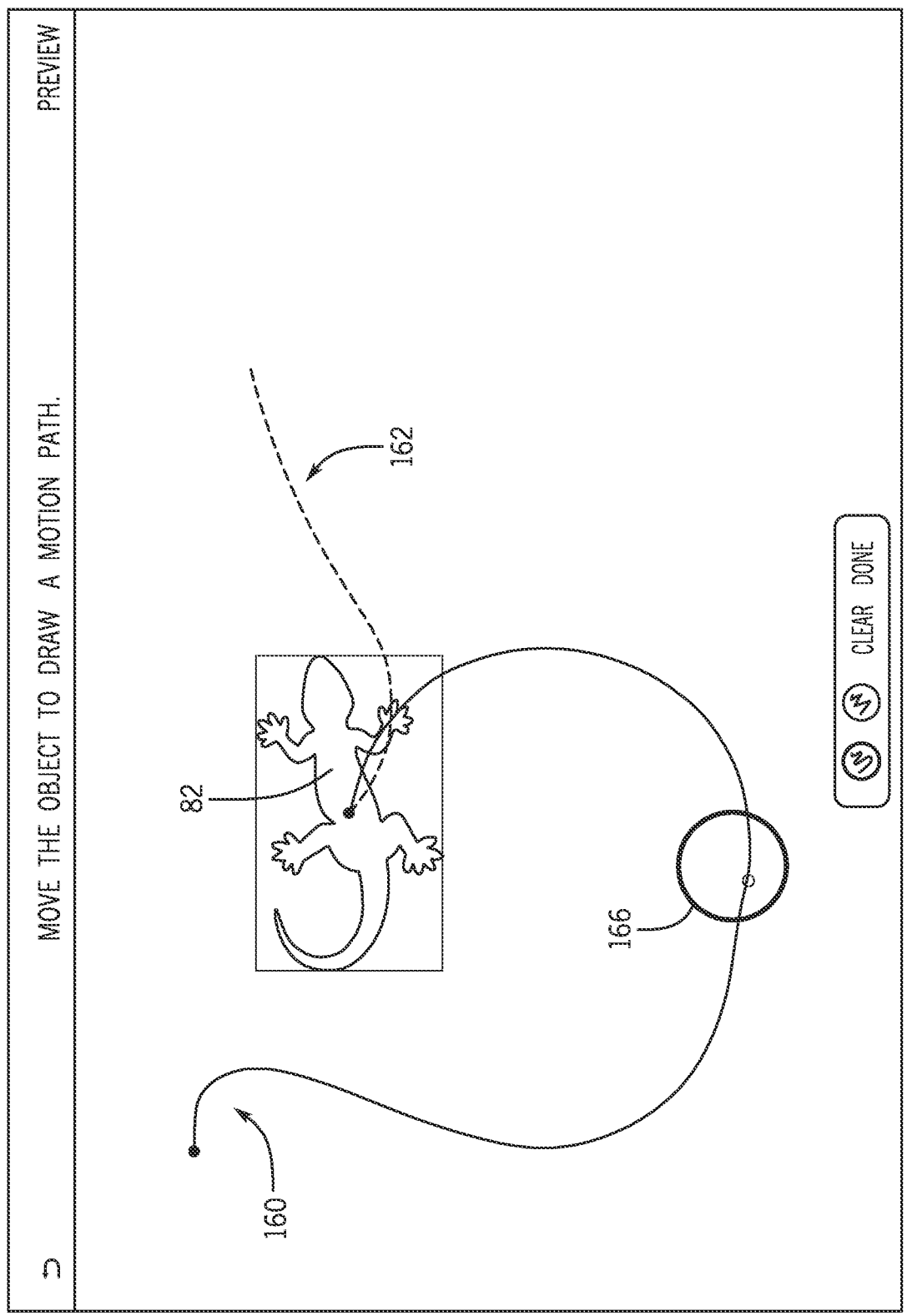
FIG. 16C is a block diagram of a redrawn segment that is automatically connected to the motion path, in accordance with an embodiment of the present disclosure.

As shown in FIG. 16C, the user may draw a new motion path 108, here a freehand motion path 108 for the first segment 160. The user may finish drawing, such as by lifting finger/pencil used for drawing, the motion path 108 at a new end point 166. As shown, the new end point 166 does not connect to the original end point 165 to complete the preexisting entire motion path 108. However, the redrawn first segment 160 may be automatically linked to the second segment 162. For example, the application may be preset (e.g., via an algorithm) to force a redrawn segment to begin and finish at the same starting point 163 and the original end point 165. In this manner, the object 82 may transition smoothly along the redrawn first segment 160 and the second segment 162 of the motion path 108.

Figure 17A:
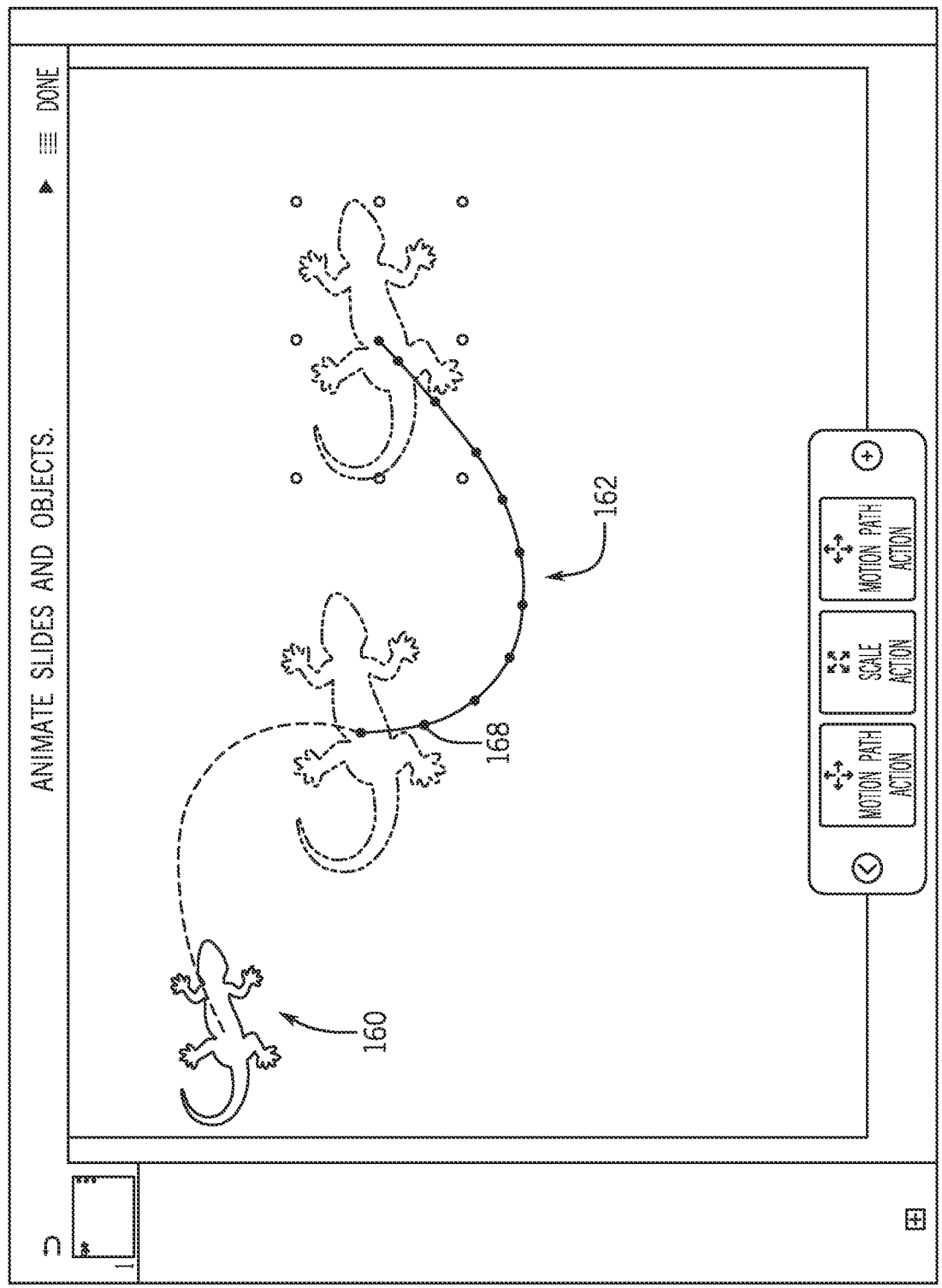
FIG. 17A is a block diagram of editing points rendered on a segment path in response to a request to edit the segment, in accordance with an embodiment of the present disclosure.

In some embodiments, a user may select a particular segment of the motion path 108 in editing mode 80 and in response, multiple editing points may appear on the selected segment to facilitate reshaping the motion path 108. To illustrate, FIG. 17A depicts multiple editing points 168 on a segment of the motion path 108 in response to a request to edit the segment, such as by selecting the particular segment. Here, the user has selected the second segment 162, and accordingly, multiple editing points 168 appear throughout the second segment 162 at intervals. In some embodiments, the intervals are located in a manner that facilitates detectable changes to the editing points 168. For example, since a finger may be used to draw the motion path 108, the editing points 168 may be spaced at intervals measuring approximately the size of a finger. Thus, selecting a single editing point 168 using a finger may be possible and that would otherwise be difficult with narrower intervals. Moreover, as previously discussed, a user may edit the number of editing points 168 by selecting the "edit points" option in the editing dialog box 164 of FIG. 16A.

Figure 17B:
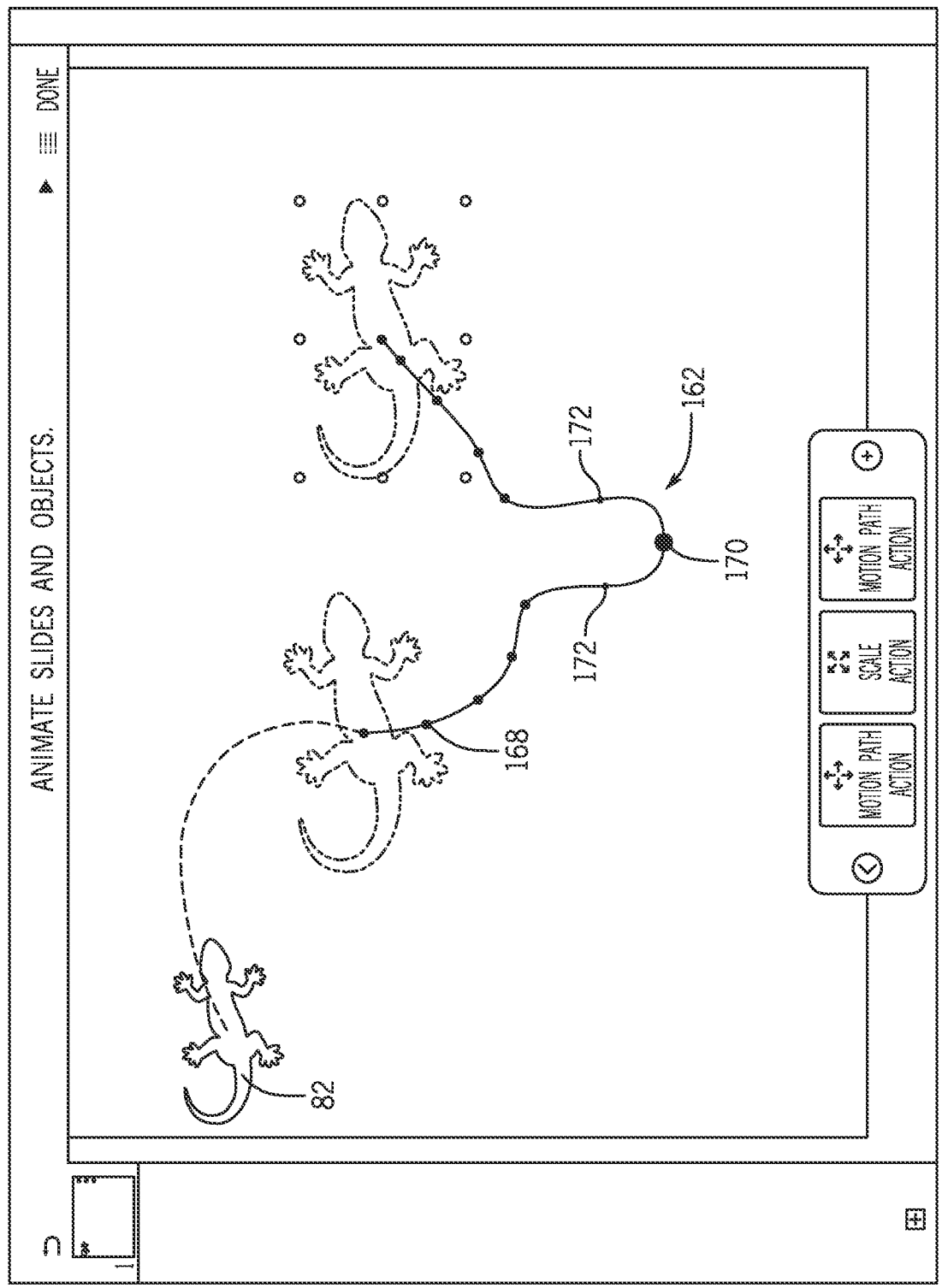
FIG. 17B is a block diagram of changing the shape of the segment path using the editing points of FIG. 17A, in accordance with an embodiment of the present disclosure.

Turning to FIG. 17B, the shape of a selected segment (e.g., second segment 162) may be reshaped using the editing points. Upon selecting a particular point from the editing points 168, the selection may be indicated by a respectively larger point, referred to as a selected point 170. As shown, the selected second segment 162 may be reshaped by selecting and dragging the selected point 170. Moreover, the selected point 170 may be associated with two mid-points 172 between the selected point 170 and neighboring editing points 168. The mid-points may indicate optional editing points 168 that may be added. Thus, these mid-points 172 may not be part of the actual editing points 168 unless they are selected. To add the mid-points 172 as editing points 168, such that they may be selected as a selected point 170 used for reshaping, the user may select either or both of the mid-points 172.

In current embodiment, the modified shape of the second segment 162 is reshaped by moving or dragging the selected point 170 and pulling the segment 162 shape correspondingly. Thus, each editing point 168 may be selected as the selected point 170 that may be subsequently used for reshaping. Moreover, the mid-points 172 may also be selected to become editing points 168, which may be subsequently selected as the selected point 170 for reshaping the second segment 162.

It may be beneficial to change a transition type from sharp to smooth or vice versa. For example, in the current embodiment, rather than the entire segment including smooth transitions along the path of the second segment 162, linear or sharp turns may be a more effective form of animation for the object 82.

Figure 17C:
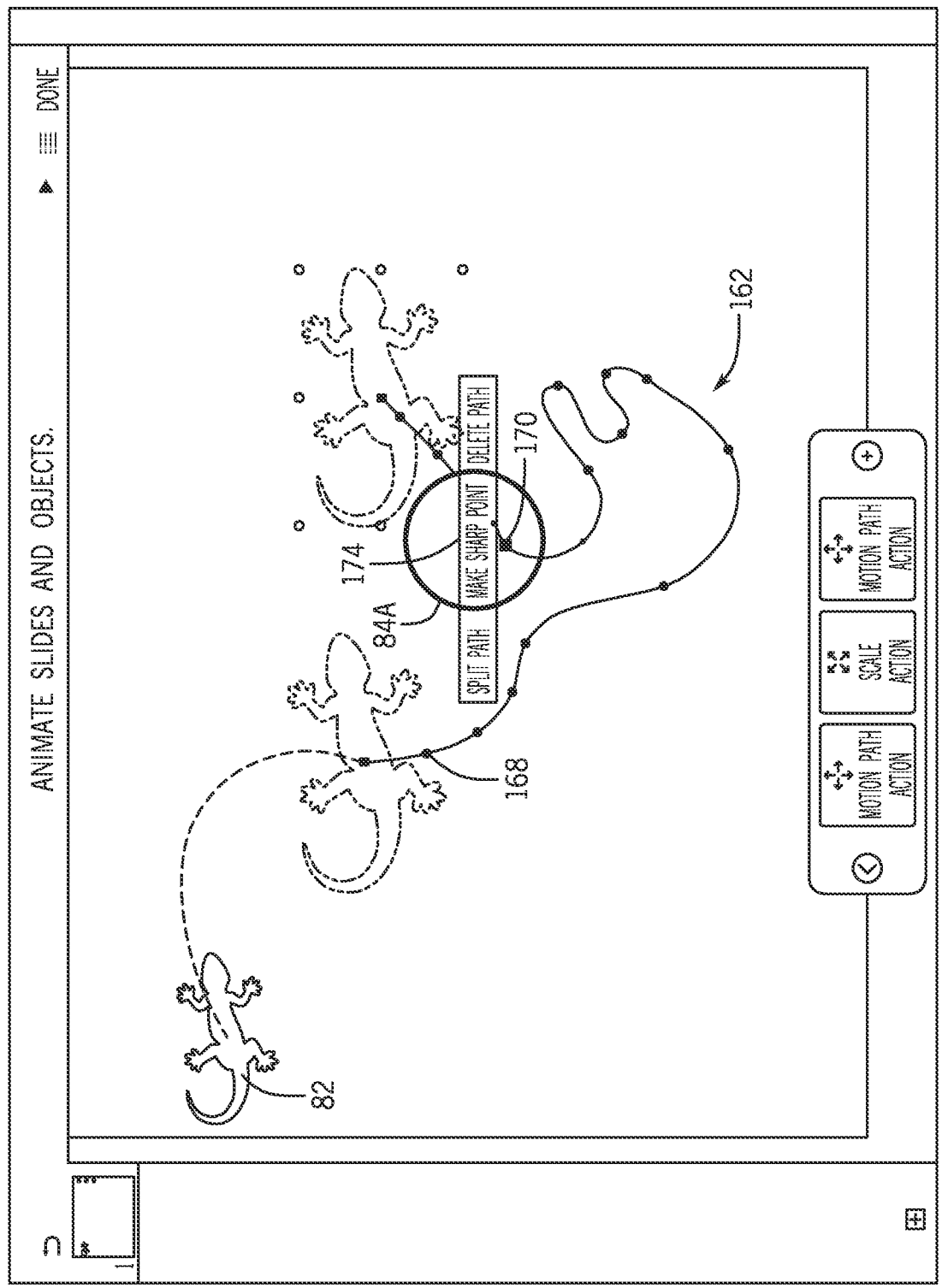
FIG. 17C is a block diagram of a dialog box for options to modify a smooth point upon a selection of a particular editing point of FIG. 17B, in accordance with an embodiment of the present disclosure.

Accordingly, FIG. 17C illustrates a shape dialog box 174 for options to edit a selected smooth segment upon a selection of a particular smooth editing point 168. As depicted, the options of the shape dialog box 174 for a smooth segment (e.g., second segment 162) may include "make sharp point," "split path," or "delete point." The "make sharp point" option may allow making a smooth angle associated with the selected editing point 168 into a sharp angle of the segment. For example, upon selecting selected point 170, a user may select 84A to transform the smooth angle along the second segment 162 associated with selected point 170 into a sharp point. Thus, the object 82 may be animated to make a sharp turn along the selected point 170 of the motion path 108 during the presentations.

Figure 17D:
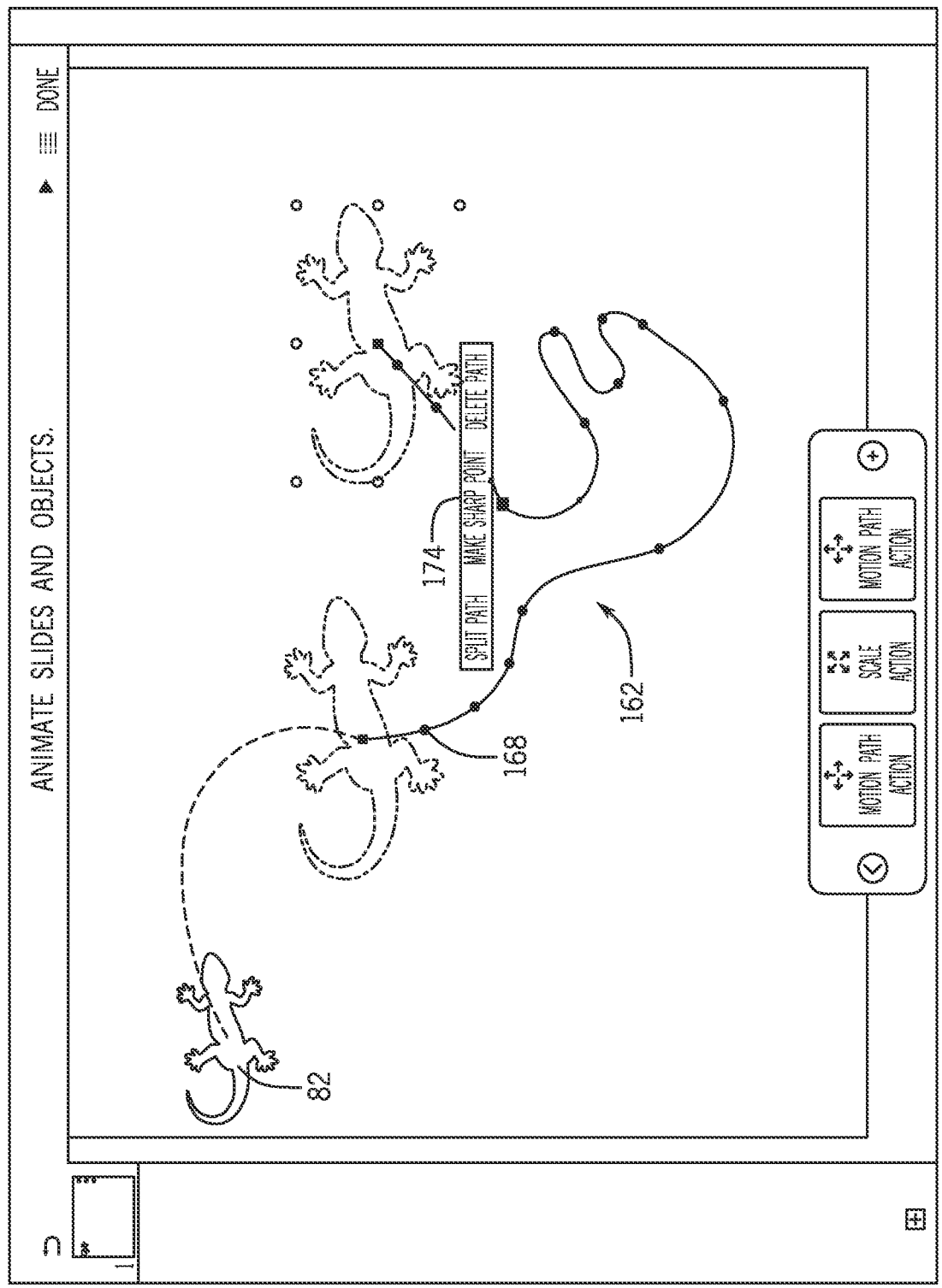
FIG. 17D is a block diagram of a dialog box for options to modify a sharp point upon a selection of a particular editing point of FIG. 17B, in accordance with an embodiment of the present disclosure.

On the other hand, if the selected segment is a straight line segment, such that the straight line drawing tool 107 was used to draw it, then the selected point 170 may currently have a sharp transition and, thus, editing options of the shape dialog box 174 may include a "make smooth point" option instead. To illustrate, FIG. 17D depicts the selected point 170 after transitioning to a sharp transition. As illustrated, the path makes a sharp turn at this selected point 170, based upon the previous selection to convert to a sharp transition. Because the selected point 170 is now a sharp transition, the shape dialog box 174 now displays with options to edit a selected sharp transition. As mentioned above, since selected point 170 was transformed from a smooth point to a sharp point in FIG. 17C, the selected point 170 is presently associated with a sharp angle. However, upon the selection of the same selected point 170 the current embodiment, the user may select the "make smooth point" to revert the selected point 170 to a smooth point associated with a smooth angle. Accordingly, the object 82 may be animated to make a smooth turn at selected point 170 along the motion path 108.

Figure 17E:
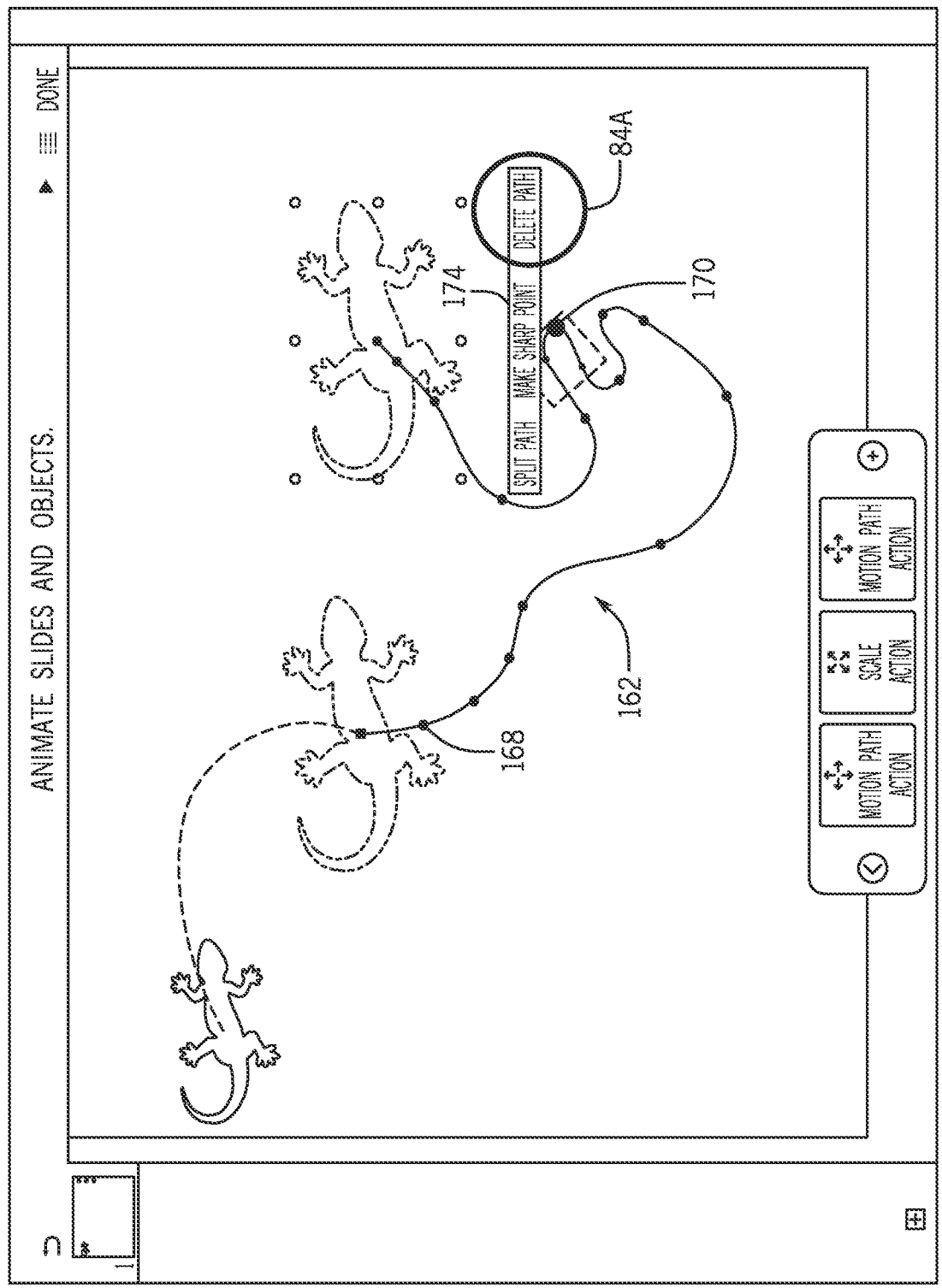
FIG. 17E is a block diagram of a selection to delete an editing point using the dialog box of FIG. 17C and FIG. 17D, in accordance with an embodiment of the present disclosure.
Figure 17F:
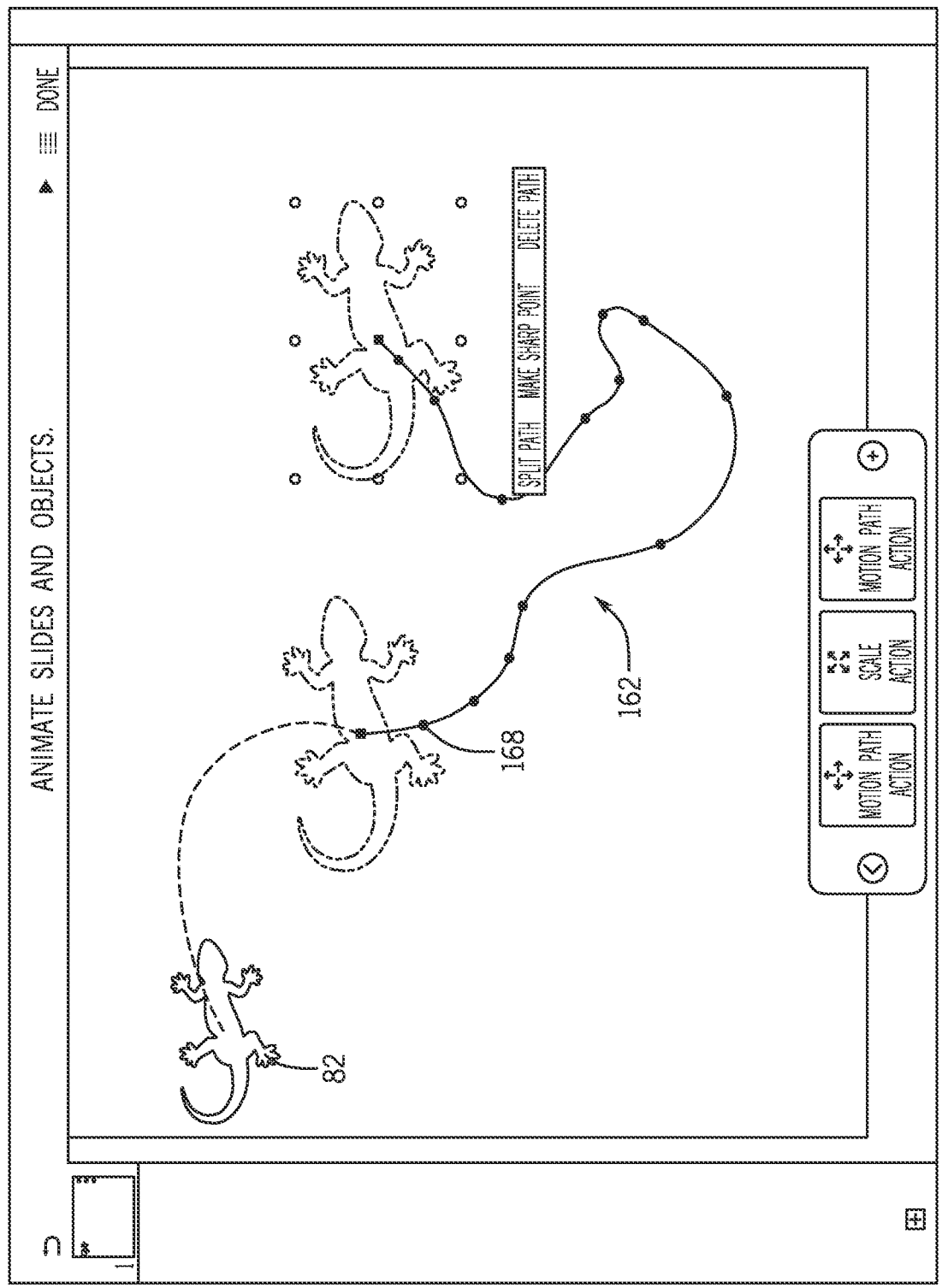
FIG. 17F is a block diagram of a deleted sub-segment corresponding to the deleted editing point of FIG. 17E, in accordance with an embodiment of the present disclosure.

As previously discussed, one or more editing points 168 may be deleted. To illustrate, FIG. 17E depicts a selection to delete an editing point 168 and sub-segment by using the shape dialog box 174. As shown, selected point 170 is selected and a user selects 84A the "delete point" option from the shape dialog box 174. Upon the selection to delete, the sub-segment of the second segment 162 of the motion path 108 associated with the selected point 170 may be deleted. By way of example, and as indicated by the dashed box, the sub-segment may include the selected point 170 up to editing points 168 on either side of the selected point 170. As shown in FIG. 17F, the sub-segment associated with the selected point 170 is deleted from the second segment 162. Moreover, the motion path 108 of the second segment 162 is automatically reconnected, such that the animation for the object 82 may smoothly transition and continue along the edited path without the sub-segment.

Figure 18A:
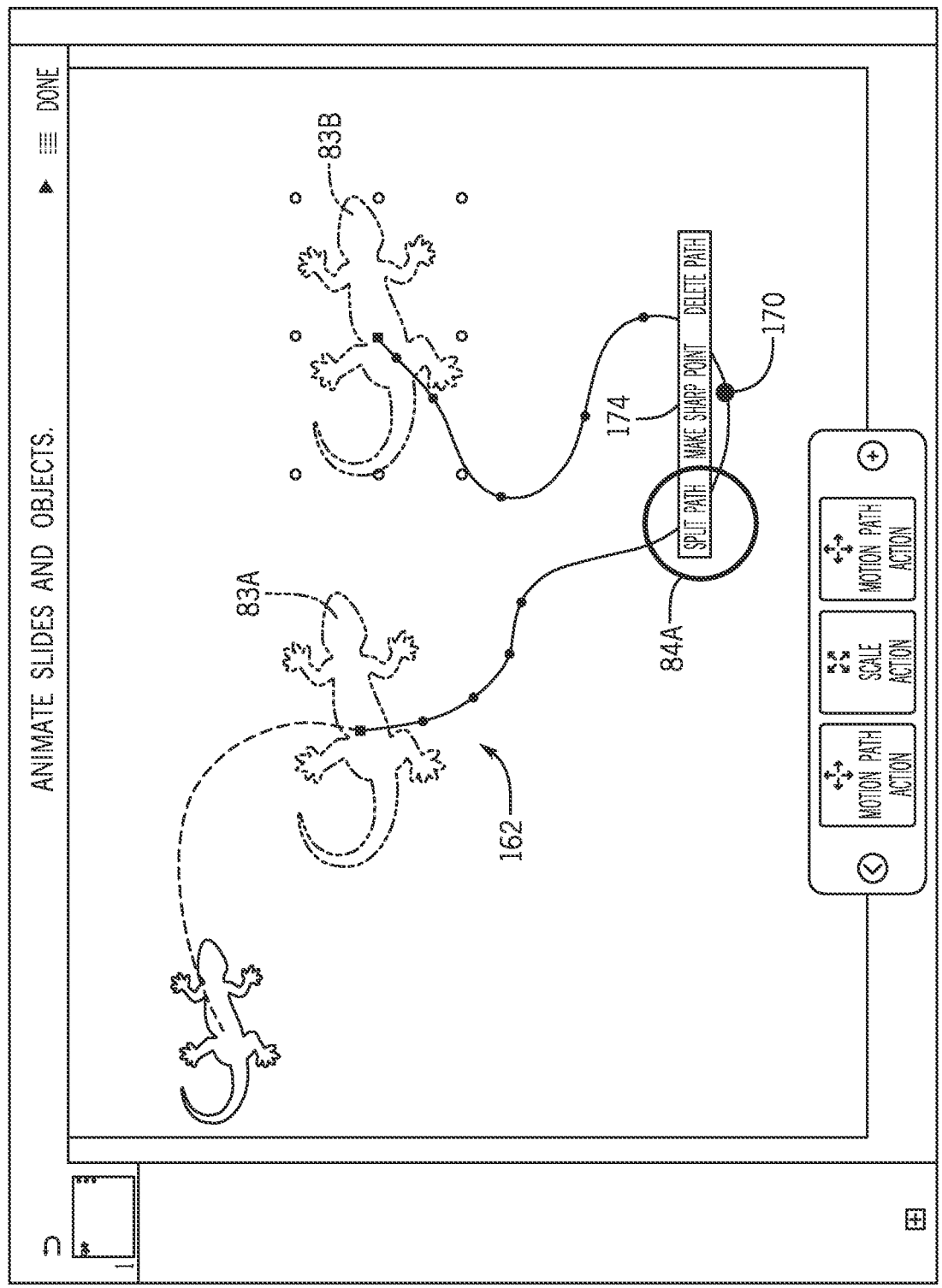
FIG. 18A is a block diagram of a selection of an option to split path in the dialog box of FIG. 17C, in accordance with an embodiment of the present disclosure.

Additionally or alternatively, a motion path 108 may be split using the "split path" option of the shape dialog box 174. To illustrate, FIG. 18A depicts a selection of a split path option using the shape dialog box 174. As shown, a selected point 170 on the second segment 162 is selected and then a user selects 84A the "split path" option from the shape dialog box 174.

Figure 18B:
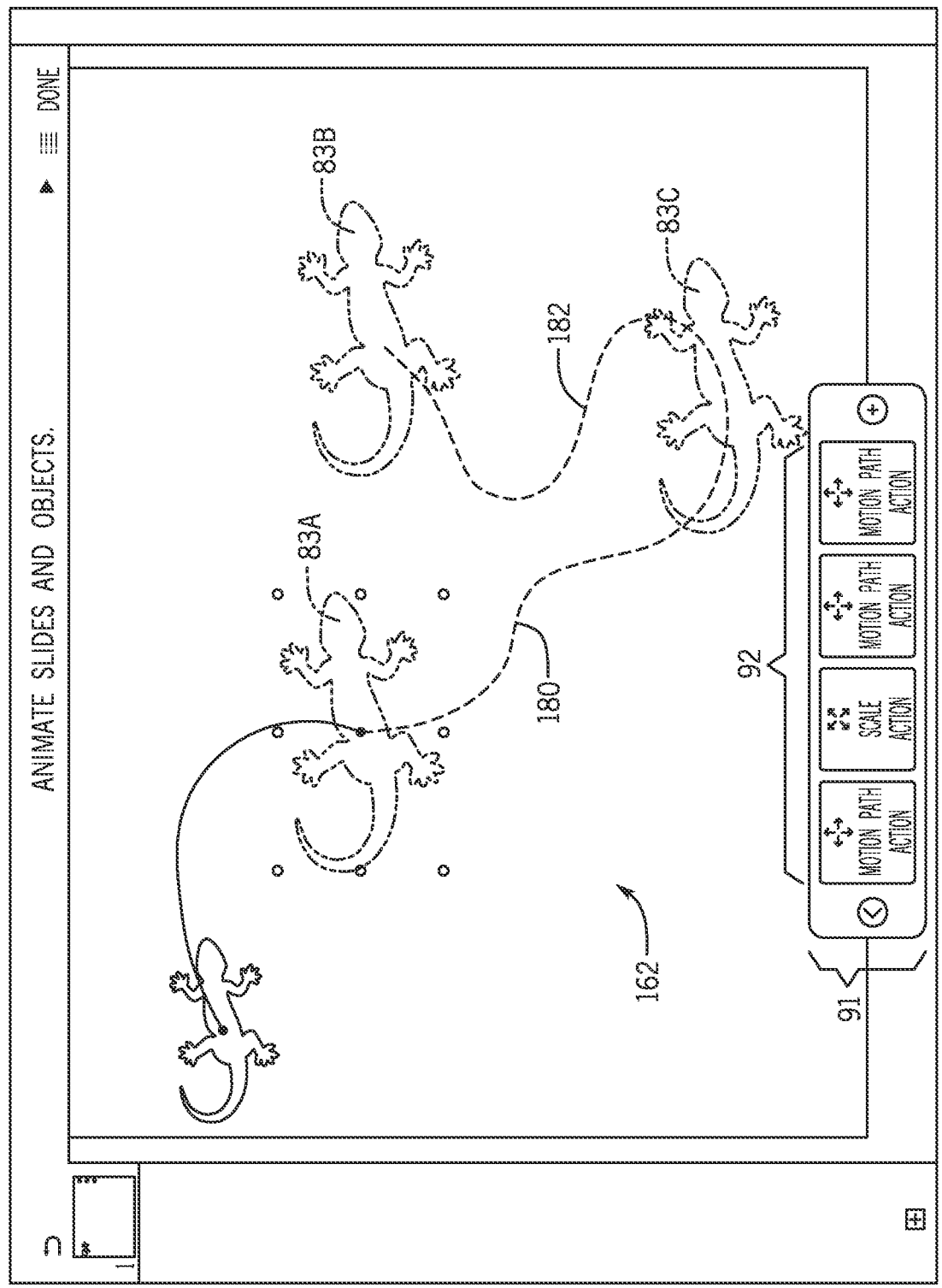
FIG. 18B is a block diagram of a split motion path segment in response to the selection to split path of FIG. 18A, in accordance with an embodiment of the present disclosure.

Upon the selection to split, the second segment 162 may be split at the selected point 170, and an additional ghost 83C may appear, as shown in FIG. 18B. The ghost 83C may be associated with a new key frame, such that there is a noticeable transition (e.g., required trigger action) at the point of the ghost 83C during animation for the object 82, as previously discussed. Moreover, the split second segment 162 may include two sub-segments. For example, the first sub-segment 180 may include the beginning of the original second segment 162 to ghost 83C, and the second sub-segment 182 may include the segment from ghost 83C to the end of the original second segment 162. Further, in response to the split path, the action build 92 may correspondingly update to reflect the split in the original second segment 162 by adding an additional "motion path" action build 92 to the editing tray 91.

Figure 18C:
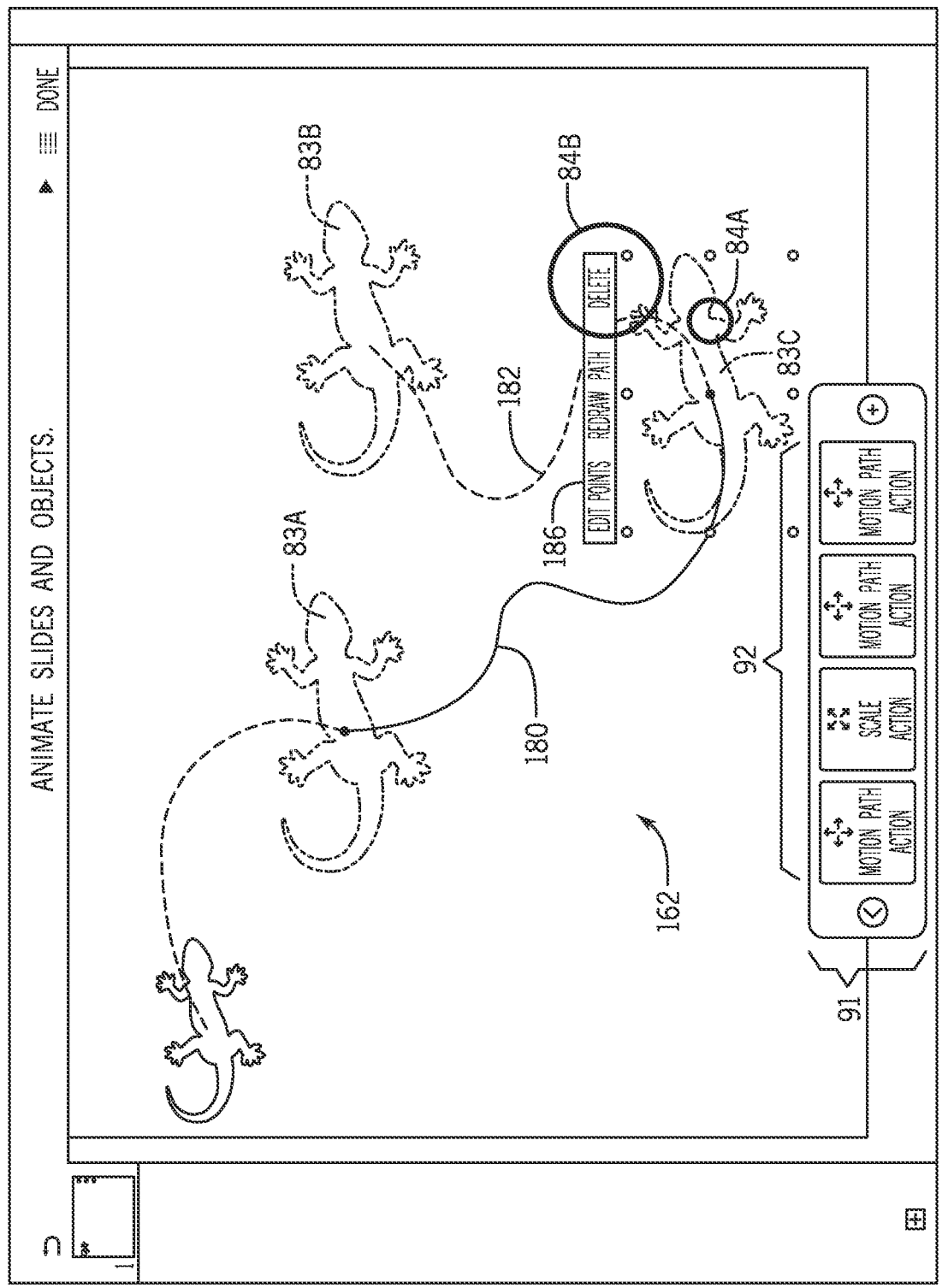
FIG. 18C is a block diagram of a selection to delete the split path of FIG. 18B, in accordance with an embodiment of the present disclosure.
Figure 18D:
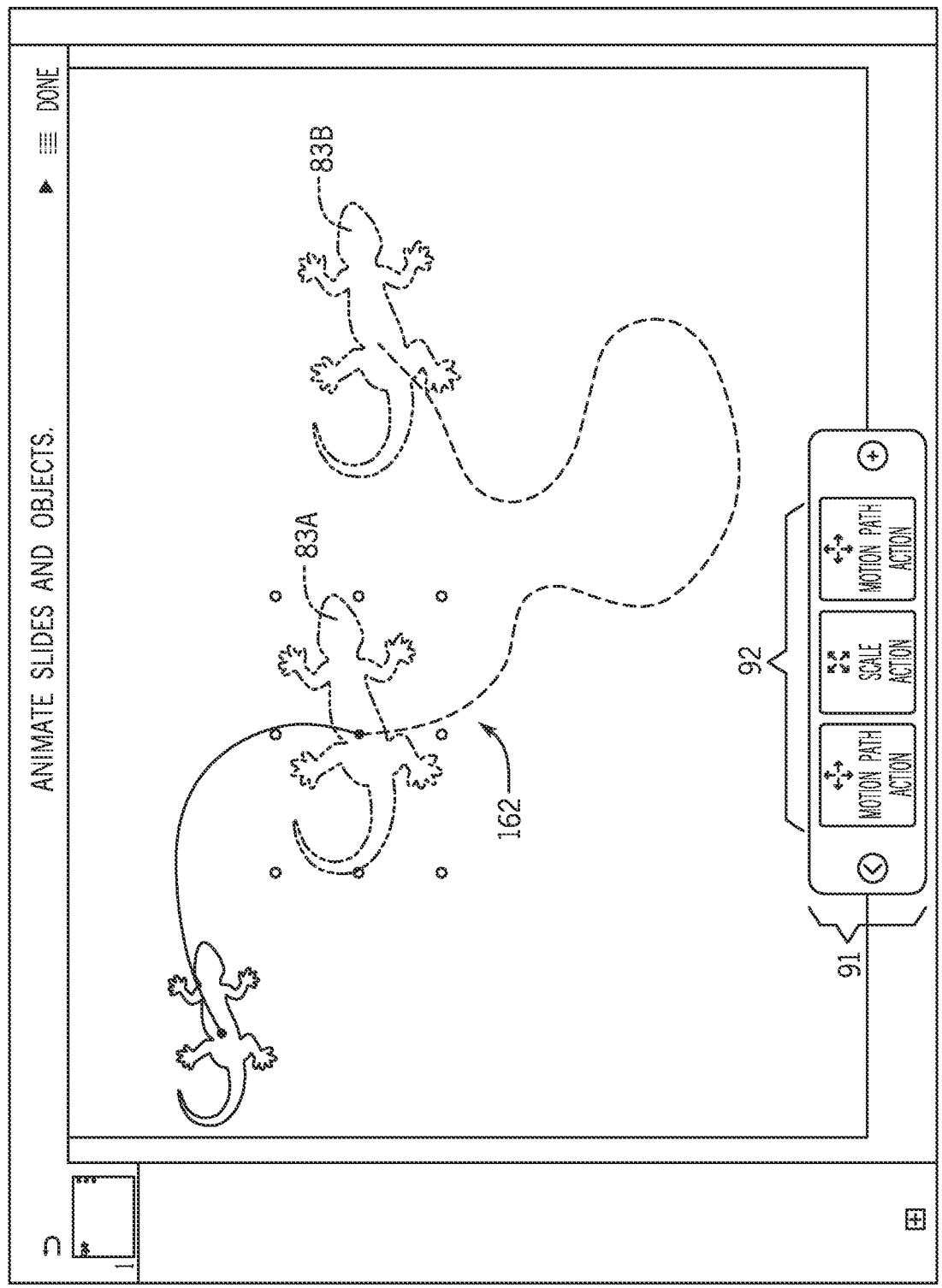
FIG. 18D is a block diagram of the split path removed in response to the selection to delete the split path of FIG. 18C, in accordance with an embodiment of the present disclosure.

Moreover, a path that has been split, such as the second segment 162 in FIGS. 18A-18B, may be edited. In particular, when a motion path 108 (e.g., segment) is split, the original motion path 108 (e.g., second segment 162) is preserved. Additionally, additional segments created in response to the "split path" option are indicated by a respective additional ghost. To illustrate, FIG. 18C depicts a selection 84A of the additional ghost 83C created in response to a split, and then a selection 84B of a "delete" option in a split path dialog box 186. Upon the selection 84B to delete, and as shown in FIG. 18D, the additional ghost 83C may be removed. In this manner, the split path is removed and the preserved second segment 162 may be restored. As such, the additional key frame associated with ghost 83C is also removed. Moreover, the editing tray 91 indicates that the additional "motion path" action build 92 that was added due to the split path has been removed.

Figure 19:
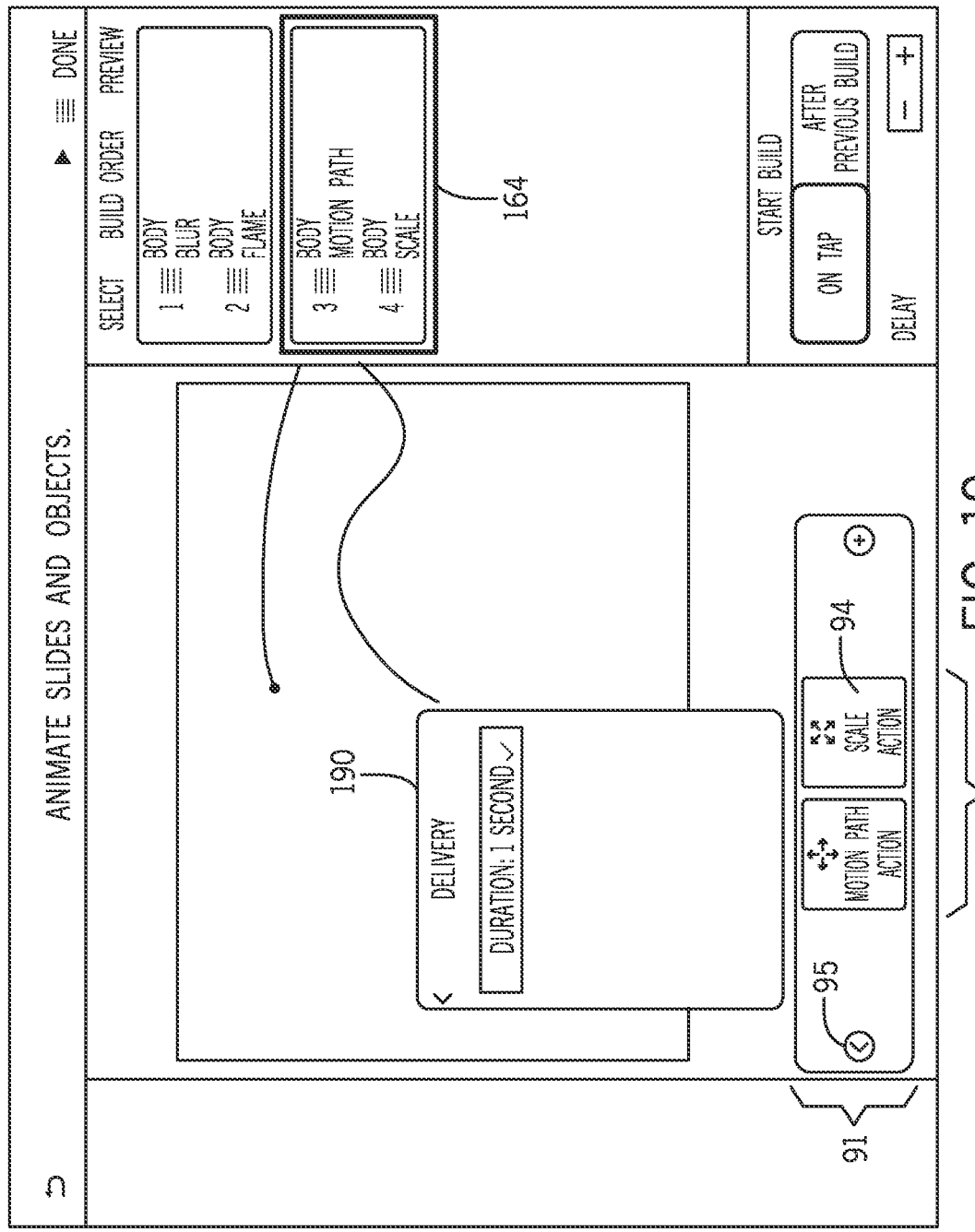
FIG. 19 is a block diagram of a dialog box with editable context-specific properties for a selected action, in accordance with an embodiment of the present disclosure.

In some embodiments, properties for action builds 92 in the editing tray 91 may be modified. For example, an animation for an object 82 may include multiple action builds 92, such as a motion path 108, a rotation, a scaling, etc. By way of example, FIG. 19 depicts a popover dialog box with options to modify properties for a selected action build 92. As shown in the editing tray 91, the actions applied for a selected object 82 may include a "motion path" and a "scale" action build 92. Upon the selection of one of the action builds 92, such as the "motion path" action build 92, a properties dialog box 190 may appear. The properties dialog box 190 may include context-specific properties that may be modified, such as by including an editable text field.

As shown, the selected action is the "motion path" action build 92, and thus, a context-specific property related to a motion path 108, such as duration of the motion path 108, may be edited. In the current embodiment, the duration may default to one second for each action build 92. However, in other embodiments, the duration may be calculated using a nonlinear rate (e.g., dynamic speed) that is based on the length of the motion path 108. For example, for a longer motion path 108, the duration of the motion path 108 may be respectively shorter, such that the animation speeds up during the particular motion path 108. On the other hand, the duration and/or speed for the motion path 108 when the length is shorter, may be longer and slowed down. Thus, time may be shortened for longer motion paths 108 and additional time may be added for the shorter motion paths 108, at a nonlinear rate. In this manner, the overall duration for longer and shorter motion paths 108 may be similar rather than having a noticeable discrepancy. Moreover, the dynamically determined speed may prevent a longer motion path 108 from lasting an excessively long time, which may otherwise have an adverse impact on a presentation.

However, since the properties dialog box 190 (e.g., context-sensitive dialog box) may be edited, the duration may be reset (e.g., 0.5 seconds, 2 seconds, 10 seconds, etc.) set. Similarly, the properties dialog box 190 may be context-specific for the selection (not shown) of the "scale" action build 92. By way of example, the property may relate to size, such as a scaling percentage (e.g., scale object 82 by 10%, 110%, etc.). In other embodiments, the animation may include additional action builds 92 that may not be viewed in the present editing tray 91. However, a user may view the other action builds 92 using the scrolling option 95 and/or add additional actions using the add action button 94, as previously described.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions that, when executed by one or more processors, cause a machine to:
   detect drawing of a motion path indicating a desired path of a motion animation applied to an object;
   detect drawing of a new motion path disconnected from an end point of the motion path; and
   automatically link the new motion path to the end point of the motion path;
   generate the motion animation of the object, wherein the motion animation comprises movement of the object along the motion path and the new motion path; and
   present the motion animation of the object along the motion path and the new motion path.

2. The machine-readable medium of claim 1, wherein the motion animation comprises one or more secondary animations as the object moves along the motion path.

3. The machine-readable medium of claim 2, wherein the one or more secondary animations comprise a rotation, a scaling, an opacity change, a blinking, a bouncing, a flipping, a jiggling, a popping, a pulsing, or any combination thereof, applied to the object.

4. The machine-readable medium of claim 1, comprising machine-readable instructions that, when executed by the one or more processors, cause the machine to:
   detect drawing of a new motion path, via a finger or stylus touch, at an end point of the motion path;
   generate a new motion animation of the object, wherein the new motion animation comprises movement of the object along the new motion path, starting at the end point of the motion path; and
   present the new motion animation as an extension of the motion animation.

5. The machine-readable medium of claim 1, comprising machine-readable instructions that, when executed by the one or more processors, cause the machine to:
   detect deletion of a segment of the motion path;
   detect redrawing of the segment, wherein the redrawn segment is disconnected from an end point of the deleted segment; and
   automatically join the redrawn segment to the end point of the deleted segment.

6. The machine-readable medium of claim 1, comprising machine-readable instructions that, when executed by the one or more processors, cause the machine to:
   receive a request to edit the motion path; and
   in response to the request to edit the motion path, generate a plurality of selectable editing points along the motion path that enable redrawing, deleting, reshaping, or any combination thereof, of at least a portion of the motion path.

7. The machine-readable medium of claim 6, wherein the plurality of selectable editing points are spaced at intervals sized for a finger width.

8. The machine-readable medium of claim 6, comprising machine-readable instructions that, when executed by the one or more processors, cause the machine to:
in response to a selection of a selectable editing point of the plurality of selectable editing points, the selectable editing point comprises a relatively larger point of the plurality of selectable editing points.

9. The machine-readable medium of claim 1, comprising machine-readable instructions that, when executed by the one or more processors, cause the machine to:
calculate a speed of the motion animation of the motion path, the speed correlating to a length of the motion path.

10. The machine-readable medium of claim 1, wherein the modification via the selected one of the plurality of selectable editing points comprises dragging the selected one of the plurality of selectable editing points, via input from the finger or the stylus, to a new location and the modifying of the motion path comprises reshaping or otherwise adjusting the motion path to include the new location.

11. A tangible, non-transitory, machine-readable medium, comprising machine-readable instructions that, when executed by the one or more processors, cause a machine to:
detect drawing of a motion path indicating a desired path of a motion animation applied to an object;
generate the motion animation of the object, wherein the motion animation comprises movement of the object along the motion path;
present the motion animation of the object along the motion path;
detect selection of the motion path;
in response to selecting the motion path, render a plurality of selectable editing points along the motion path, the plurality of selectable editing points enabling editing of the motion path based on modification via one or more of the plurality of selectable editing points;
detect a modification via a selected one of the plurality of selectable editing points; and
modify the motion path based on the modification via the selected one of the plurality of selectable editing points.

12. The machine-readable medium of claim 11, wherein the motion path is drawn using a finger contact or a stylus contact with the electronic display.

13. The machine-readable medium of claim 11, the one or more processors, configured to:
detect drawing of a new motion path disconnected from an end point of the motion path; and
automatically connect the new motion path to the end point of the motion path.

14. The machine-readable medium of claim 11, wherein the object and the animation is displayed on a slide of a presentation application on the GUI.

15. A method, comprising:
detecting drawing of a plurality of disconnected segments of a motion path, the motion path indicating a desired path of a motion animation applied to an object;
automatically connecting the plurality of disconnected segments into a single segment of the motion path;
after automatically connecting the plurality of disconnected segments, generating the motion animation of the object, wherein the motion animation comprises movement of the object along the single segment of the motion path; and
presenting the motion animation of the object along the single segment of the motion path.

16. The method of claim 15, wherein the plurality of disconnected segments is drawn via a finger contact or a stylus contact with an electronic display.

17. The method of claim 15, comprising:
determining a request to reshape at least one of the plurality of disconnected segments; and
reshaping the at least one of the plurality of disconnected segments based on the request.

18. The method of claim 17, wherein the reshaping comprises changing a linear shape to a non-linear shape or a non-linear shape to a linear shape.

* * * * *